(12) United States Patent
Harris

(10) Patent No.: US 7,288,186 B2
(45) Date of Patent: Oct. 30, 2007

(54) FILTRATE IMMERSED ACTIVATION ASSEMBLY FOR DISK FILTERS

(76) Inventor: James Jeffrey Harris, 2592 Westridge Dr., Cameron Park, CA (US) 95682

( * ) Notice: Subject to any disclaimer, the term of this patent is extended or adjusted under 35 U.S.C. 154(b) by 355 days.

(21) Appl. No.: 11/028,121

(22) Filed: Dec. 30, 2004

(65) Prior Publication Data

US 2006/0144768 A1 Jul. 6, 2006

(51) Int. Cl.
*B01D 29/68* (2006.01)
*B01D 41/00* (2006.01)
(52) U.S. Cl. ............ 210/108; 210/331; 210/332; 210/333.01; 210/390; 210/391; 210/393; 210/408; 210/411
(58) Field of Classification Search ............ 210/331, 210/106, 108, 332, 333.01, 390, 391, 393, 210/408, 411
See application file for complete search history.

(56) References Cited

U.S. PATENT DOCUMENTS

| | | | |
|---|---|---|---|
| 1,642,673 A | 9/1927 | Genter | |
| 1,642,864 A | 9/1927 | Williams | |
| 1,926,557 A | 9/1933 | Perkins | |
| 2,422,735 A | 6/1947 | Laguardia | |
| 3,289,839 A | 12/1966 | Muller | |
| 3,637,079 A | 1/1972 | Strub | |
| 3,666,097 A | 5/1972 | Ryan | |
| 4,042,504 A | 8/1977 | Drori | |
| 4,045,345 A | 8/1977 | Drori | |
| 4,156,651 A | 5/1979 | Mehoudar | |
| 4,202,768 A | 5/1980 | Longe | |
| 4,271,018 A | 6/1981 | Drori | |
| 4,295,963 A | 10/1981 | Drori | |
| 4,308,142 A | 12/1981 | Braukmann et al. | |
| 4,402,829 A | 9/1983 | Cordua | |
| 4,430,232 A * | 2/1984 | Doucet | ............ 210/798 |
| 4,552,669 A | 11/1985 | Sekellick | |
| 4,592,839 A | 6/1986 | Rosenberg | |
| 4,655,910 A | 4/1987 | Tabor | |
| 4,655,911 A | 4/1987 | Tabor | |
| 4,714,552 A | 12/1987 | Tabor | |
| 4,776,962 A | 10/1988 | Wakeman | |
| 4,830,747 A | 5/1989 | Kubota | |
| 4,906,357 A | 3/1990 | Drori | |
| 4,906,373 A | 3/1990 | Drori | |
| 4,923,068 A | 5/1990 | Crowson | |
| 4,923,601 A | 5/1990 | Drori | |
| 5,393,423 A | 2/1995 | Drori | |
| 6,318,563 B1 | 11/2001 | Drori | |
| 6,752,920 B2 | 6/2004 | Harris | |
| 2003/0178350 A1* | 9/2003 | Harris et al. | ............ 210/107 |

* cited by examiner

*Primary Examiner*—Krishnan S. Menon
*Assistant Examiner*—Benjamin Kurtz

(57) ABSTRACT

A self cleaning filtration device wherein an activation piston, laterally supported within an activation cylinder is immersed in filtrate within the confines of an immersion chamber. The immersion chamber receives filtrate from a disk filtration stack via orifices and sparger support tubes (the "Tubes"). Gas pressure (i) drives the piston, the Tubes, and the disk compression block upward and (ii) forces the immersion chamber fluid through the Tubes to separate the disks. The Tubes contain gas entrainment orifices on the side of the piston that are configured to facilitate entrainment of gas into the fluid. The entrained fluid impacts the opened disks with a high energy dispersed scouring action, to flush the disks clean.

24 Claims, 13 Drawing Sheets

FILTRATE IMMERSED ACTIVATION ASSEMBLY FOR DISK FILTERS

BACKGROUND

1. Field of Invention

This invention provides a method and device to purvey an efficient, reliable and cost effective self cleaning disk filtration process.

2. Description of Prior Art

Modern industry and agriculture both require filtration technologies of varying capacities. Initially, innovative and higher efficiency filtration technologies evolved primarily out of the industrial market needs with agricultural filtration needs being satisfied by relatively simple and somewhat crude technologies. Concurrent with worldwide agricultural growth, and specifically as a consequence of the development of high efficiency drip tube irrigation technologies, the demand and consequential development of much more efficient, yet cost effective and reliable agricultural filtration processes burgeoned. Indeed, the previous trend of agricultural filtration technologies being primarily low cost derivatives of industrial designs has been superseded by the current industrial interest in employing modern agricultural derived technologies to industry. In many cases, adaptation of agricultural based filtration technologies into industrial applications have been positive and straight forward. Other industrial applications however, have encountered problems.

Disk filtration is one of the most promising of the filtration processes applied to the agricultural market. These agricultural based disk filtration technologies of the prior art however were fraught with problems and difficulties when applied to industrial service. The invention defined herein provides resolution to these problems and difficulties. As a point of fact, the new disk filtration technology defined herein defines superior performance for a majority of industrial filtration needs.

Disk filtration technology has been developed over many decades. There are generally two categories referenced in the art as disk filtration. One such category incorporates the parallel mounting of one or more disks comprised of a screening material encapsulating a substantially hollow plate-like structure which is generally mounted on a filtrate conduit. In such art, the filtration process occurs across the disk encapsulating screens wherein the screens may or may not include the provision of a filter aid coating such as diatomaceous earth. This subcategory of filtration technology has been commonly employed in industry for decades.

The second category of disk filtration has been developed primarily, though not exclusively, through agricultural needs. This category is the focus of this invention. This art embodies the employment of multiple ring-type disks, generally, though not always, made of a plastic material, stacked together to compose a primarily hollow cylindrical assemblage. Unfiltered water is forced, under pressure, to pass between these disks in a substantially radial direction, typically from the external to the internal side of the stack. Various types of protrusions or surface topology of the disks provide for the trammeling of particulate matter suspended in the fluid. Particle capture occurring upon the external surfaces of the cylindrical assemblage and/or upon the topologically rendered, adjacent contacting surfaces of the disks. Wherein for clarity, the trammeling surface external to the stack is substantially perpendicular to the direction of flow while that of the contacting surfaces is substantially coplanar with the direction of flow. The filtrate typically exits internal to the hollow disk stack and is ported from there to process for use.

The geometrical configuration and associated filtration mechanism of the disks as defined in the prior art are diverse. Reference is made to an early disk filter process wherein tapered disks with radial oriented internal filtrate porting was proposed for removal of a disperse sizing of particles is demonstrated in U.S. Pat. No. 1,643,299.

Other configurations practiced in the art are delineated in U.S. Pat. Nos. 2,847,126, 3,648,843, 3,827,568, 4,430,232, 4,707,259 and 4,726,900. In these practices perturbations and/or other spacing mechanisms are embodied on the disk surfaces so as to facilitate geometrical spacing between adjacent disks consistent with the required filtration size or grade. In such art the unfiltered water is constrained to pass radially between the disks of the cylindrical assemblage. Particles larger than the disk spacings therefore being trammeled upstream of the constrained fluid path. Various manifestations of this art have been further proposed in which an upstream configuration of the disks is so modified as to provide for an increased upstream surface lineage, thereby providing for an enhanced particle trammeling area. Reference is made to U.S. Pat. No. 4,410,430.

Further lessons of the art demonstrate an employment of surface grooves on one or both sides of the disks for the provision of flow channels between abutted disks. The size and geometry of said channels being the constraint on the passage of particles. Particles of sufficient size are trammeled at the entrance to the groove channels. References to these developments of the art are provided in U.S. Pat. Nos. 1,642,864 and 3,195,730.

As is compulsory with filtration processes in general, disk filtration processes require some means of filtration media surface cleansing to remove the collected solids separated from the treated fluid. Some examples of the prior art demonstrate little discussion of this issue. It can only be assumed that in these cases either disposal or disassembly and manual cleaning must be the procedure of choice. A drawback of disposal option is the expense of replacement. A disadvantage of disassembly and cleaning is the expense of labor and associated process downtime.

Prior art has evinced many examples in which the disks are cleaned through a mechanical means and/or hydraulic means. Such means being accomplished in automated, semi-automated or manually implemented processes. An example, cited in the prior art of a mechanical means for cleaning, demonstrates a procedure wherein the disks are rotated relative to one another providing a scraping mechanism and thereby facilitating removal of the collected debris. U.S. Pat. No. 1,926,557 as an example of such art. Detriments inherent in this application of the art are mechanical complexities involved in maintaining the proper relative disk orientations and the rotary mechanisms necessary to facilitate relative disk rotations. This example of the prior art also suffers from a detrimental tendency to smear or extrude rather than remove those collected solids which are soft and pliable.

Prior art has demonstrated other mechanical cleaning methods wherein brushes are employed to clean accumulated debris from the outer surface of a cylindrical filtration disk stack. Reference is made to U.S. Pat. No. 2,422,735 relating to such an invention. This example of the art suffers from mechanical complexity, high wear problems and fouling of the brushes.

Prior art has cited many examples of hydraulic cleaning processes. In these embodiments of the art, a washing liquid, generally filtrate, is directed to flush the collected solid debris from the disk stack. In the simplest form of the art, filtrate is forced to flow in a reverse manner through the filter with the aim of dislodging, separating and transporting collected solids from the filter. Solids entrained reverse flush waste fluid is then generally ported-aside for further processing or discharge.

An agricultural application in which such a reverse flow imbued cleaning process has found common use is irrigation system pre-filtration processes. In these applications, a plurality of filtration bodies containing disk filter stacks are operated in a parallel manner between a common inlet manifold and a common outlet manifold. Pressurized, unfiltered water passes from the inlet manifold through the filters, where solids are collected, and enters the slightly less pressured outlet manifold as filtrate for irrigation use.

Applications of such embodiments wherein an irrigation system and filtration process are so configured to facilitate reverse flowing pressurized filtrate from an outlet manifold for flushing of filters have been common. In these applications inlet flow to a chosen filtration body is diverted from communication with an inlet manifold to communication with a waste flush manifold. Pressure in the waste flush manifold is maintained at a level substantially lower than that of the outlet manifold. As a consequence of this pressure differential, filtrate from the outlet manifold flows in a reverse manner through the chosen filter body into the waste flush manifold. Solids collected in the chosen filter body are dislodged and conveyed, entrained within the reverse flowing stream, into the waste flush manifold for eventual discharge. Subsequent to cleaning, the filter is brought back into the filtration mode by restoration of communication to the inlet manifold and isolation from the waste flush manifold. The filtration system cleaning process then continues with sequential repetition of similar reverse flowing filtrate flushing on the remaining filter bodies in the system.

This embodiment of the art has historically found abundant applications, though it suffers substantially from inherent inadequacies in cleaning efficiency of the disk filtration surfaces. These inadequacies result from localized channeling of the flushing filtrate through isolated areas of the disk stacks as well as insufficient reverse flowing filtrate energy and associated cleaning activity to adequately dislodge solids adhering to the filtration surfaces. Consequently, such embodiments have proven to be labor intensive, requiring excessive maintenance for periodic manual cleaning of the filtration disk stacks. Mechanical failures and associated unreliability concerns are particularly prevalent and troublesome when the cleaning cycle frequency is high, as is a consequence of incomplete cleaning of the disks.

In response to the inadequacies of the simple reverse flowing filtrate flushing process, further developments of the art have been cited. To reduce channeling effects and to mechanically assist in dislodging solids adhered to disk filtration surfaces, several embodiments of the art have been cited wherein a filter disk cylindrical assemblage is decompressed and axially opened. In these embodiments an axial compressive force, which normally holds the disks tightly together, as a cylindrical stack during the filtration process, is removed in such a fashion that the filtration disk stack is substantially opened and the filtration disks rendered free floating in the axial direction. Reverse flowing filtrate is then directed through the open disk stack to flush collected solids debris from the opened and now accessible filtration surfaces. Upon completion of flushing, the disks are brought back together in compression and the filtration process resumed. Reference is made to U.S. Pat. Nos. 4,156,651, 4,402,829, 4,592,839 and 4,714,552 for examples cited of this art. These developments, though somewhat successful in improving the cleaning efficiency of the disks, still suffered from inadequate filtrate flushing energy and cleaning action upon the filtration surfaces of the disks.

Cleaning action in these examples of the prior art are burdened, especially within industrial applications, by an adherence of adjacent disks. As a result of collecting sticky or tacky solids between the disks, the disk elements will not separate when the compression force is removed for flushing. Accordingly, the filtration surfaces of these fused disks cannot be flushed. Frequent maintenance for manual cleaning is a necessity for many such industrial applications employing this prior art. As a result, such embodiments have proven to be labor intensive with an excessive amount of maintenance required for periodic manual cleaning of the filtration disk stacks. Mechanical failures and associated reliability concerns are particularly troublesome when the cleaning cycle frequency is high, as is a consequence of incomplete cleaning of the disks.

These embodiments of the prior art also suffer from failure of seals associated with disk stack compression and release mechanisms. These mechanisms require moving and sealing surfaces wherein sealing is necessary to provide isolation between the filtrate internal to the disk stack and the raw, dirty water external to the disk stack. As a consequence of a pressure differential between the internal filtrate side and external dirty water side of the filtration disk stack, dirt, grit and other detritus laden water tends to seep across the sealing surfaces. Inherent to this seepage is a deposition of dirt, grit and other detritus against the high pressure, dirty water side of the sealing surface. As a consequence of the location and abrasive nature of this deposit; abrasion, scoring and eventual sealing failure occurs. Leakage results and filtrate quality is compromised. Accordingly, these embodiments of the prior art have proven to be both unreliable and maintenance intensive.

In response to unacceptable performance and excess maintenance requirements, further developments of the art have been advanced. Developments have been cited in which a directed flushing spray, of higher velocity than available in the earlier cited examples of the prior art, is directed over a relatively small area of filtration disk surfaces. As a consequence of the limited filtration disk area contacted by the directed spray, the spray and/or the cylindrical disk stack are mechanically maneuvered, relative to each other, so as to facilitate exposure and cleaning of the entire disk filtration stack surface by the directed spray. In several of these embodiments the directed spray is generated by a drafting or suction type of action across the filtration surfaces. To facilitate this action, filter environs, comprising an internal volume of a filter housing and an associated enclosed disk stack, are maintained at a pressure elevated above that of an external waste flush fluid manifold. A hollow, open ended or slotted conduit tube, which is in hydraulic communication with the waste flush manifold, is perpendicularly juxtaposed against a relatively small upstream area of the filter disk stack. In response to a pressure differential between the fluids constrained within the filter environs and the conduit tube, a converging spray is drafted past and through a relatively small area of the disk stack and into the open end or slot of the conduit. This induced flow dislodges, cleans and conveys collected solid debris from the disk filtration surfaces to the waste flush manifold for further processing or discharge. As a consequence of the limited area of the filtration surfaces contacted by the converging fluid, the open end or slot of the conduit tube and/or the cylindrical disk stack are mechanically maneuvered, relative to each other, so as to facilitate cleaning of the entire filtration surface. Such embodiments have been cited to also include mechanisms for decompression of the disk stack. This action, as was previously recited, promotes access to the disk filtration surfaces to ameliorate the cleaning process. Examples delineating these lessons of the art are referenced as U.S. Pat. Nos. 4,042,504, 4,045,345, 4,271,018, 4,295,963, 4,906,373 and 4,923,601.

A disadvantage associated with these examples of the art is an excess volume of waste flush fluid generated. In these examples the drafting action generates a convergence of flow from the filter environs. A substantial portion of the drafted fluid does not adequately contact the filtration surfaces to provide effective cleaning. Consequently, there is an excess volume of waste fluid generated. Flushing energy and cleaning action are also limited as a result of relatively small pressure differentials inciting the fluid to draft across the disk surfaces. Further, as previously discussed with other examples of the prior art wherein disk decompression occurs prior to flushing, these embodiments also suffer from seal failure and adhesion of adjacent disks.

Other examples of the prior art have been cited in which a flushing flow is delivered in the form of one or more pressured flushing sprays directed over relatively small areas of a filtration disk stack. Cited examples have professed sprays in several formats, one being wherein a high pressure flushing fluid is delivered from external of a filter to one or more spray nozzles incorporated onto an axially movable and rotatable conduit. In such embodiments, filtration flow is typically in a radial direction, external to internal through a hollow cylindrical stack of filtration disks. The spray nozzles are upon the conduit, which extends within the hollow cylinder of the filtration disk stack. The spray nozzles are so oriented as to facilitate a flushing spray, directed radially outwards, through the disk stack. Axial and rotational relative motion of the sprays across the disk stack occurs via axial and rotary motion of a section of the rigid conduit external to the filter. This motion provides spray contacting of the entire interior surfaces of the disk stack. Such embodiments have been cited to also include mechanisms for decompression of the disk stack. This action, as was previously recited, promotes access to the disk filtration surfaces to ameliorate the cleaning process. Examples of such embodiments can be referenced as U.S. Pat. Nos. 4,308,142, 4,655,910, 4,655,911, 4,906,357, 5,393,423 and 6,318,563.

Modifications manifest within these cited examples improve filtration performance on some industrial applications, though problems with disk adherence and plugging still exist within many industrial applications. These embodiments of the prior art also suffer from failure of seals associated with the movable conduit and seals associated with disk stack compression and release mechanisms. Conduit seals are necessary to provide isolation between pressured raw and dirty water internal to the filter and external environs of the filter.

As a consequence of a pressure differential between the filter external and internal environs, dirt, grit and other detritus laden water tends to seep across the sealing surfaces. Inherent to this seepage is a deposition of dirt, grit and other detritus against the high pressure, dirty water side of the sealing surfaces. As a consequence of the location and abrasive nature of this deposit; scoring of the seal surfaces followed by leakage and sealing failure eventually occur. Similarly, these embodiments of the prior art also suffer from failure of seals associated with disk stack compression and release mechanisms. These mechanisms require moving and sealing surfaces wherein sealing is necessary to provide isolation between the filtrate internal to the disk stack and the raw, dirty water external to the disk stack. As a consequence of a pressure differential between the internal filtrate side and external dirty water side of the filtration disk stack, dirt, grit and other detritus laden water tends to seep across these sealing surfaces. Inherent to this seepage is a deposition of dirt, grit and other detritus against the high pressure, dirty water side of the sealing surface. As a consequence of the location and abrasive nature of this deposit, abrasion, scoring and eventual sealing failure occurs. As a result, leakage occurs and filtrate quality is compromised. Because of these multiple sealing problems, these embodiments of the prior art have proven to be both unreliable as well as maintenance intensive. As a further disadvantage, the flushing sprays in these embodiments do not provide focusing means to maximize hydraulic energy and impact of the sprays as is necessary to adequately separate adhering disks and scour the filtration disk surfaces. These flushing sprays of the prior art do not provide and maintain sufficient energy and disk cleaning activity necessary for many industrial applications.

Another embodiment of the prior art citing disk flushing by directed sprays, employs the delivery of flushing fluid from external of a filter to a full circle spraying assembly via a conduit tube movably situated through a filter housing and internally extending axially into a filtration disk stack. Reference U.S. Pat. No. 4,156,651. In this embodiment, disk flushing is purveyed by a relatively thin circular, planar type spray, directed and impacting radially outward upon the disk surfaces. To facilitate full coverage of the disk stack during a flushing operation, the circular spraying assembly is extracted axially through the disk stack, as motivated by movement of the conduit, concurrent with full circle, radial spraying of flushing fluid through the disks. Such embodiments have been cited to also include mechanisms for decompression of the disk stack. This action, as was previously recited, promotes open access to the disk filtration surfaces to ameliorate the cleaning process. Developments manifest within this cited example improve filtration performance on some industrial applications, although problems with disk adherence and plugging still exist within many other industrial applications. This embodiment of the prior art also suffers from failure of seals associated with the movable conduit and seals associated with disk stack compression and release mechanisms. Conduit seals are necessary to provide isolation between pressured, dirty water internal to the filter and external environs of the filter. As a consequence of a pressure differential between the internal and external environs of the filter, dirt, grit and other detritus laden water tends to seep across these seals. Inherent to this seepage is a deposition of dirt, grit and other detritus against the high pressure, dirty water side of the seal. As a consequence of the location and abrasive nature of this deposit; scoring of the seal surfaces followed by leakage and sealing failure eventually occur. Similarly, this embodiment of the prior art also suffers from failure of seals associated with disk stack compression and release mechanisms. These mechanisms require moving and sealing surfaces wherein sealing is necessary to provide isolation between the filtrate internal to the disk stack and the raw, dirty water external to the disk stack. As a consequence of a pressure differential between the internal filtrate side and external dirty water side of the filtration disk stack, dirt, grit and other detritus laden water tends to seep across these sealing surfaces. Inherent to this seepage is a deposition of dirt, grit and other detritus against the high pressure, dirty water side of the sealing surface. As a consequence of the location and abrasive nature of this deposit, abrasion, scoring and eventual sealing failure occurs. As a result, leakage occurs and filtrate quality is compromised. Because of these multiple sealing problems, these embodiments of the prior art have proven to be both unreliable as well as maintenance intensive. As a further disadvantage, the flushing sprays in these embodiments do not provide focusing means to maximize hydraulic energy and impact of the sprays as is necessary to adequately separate adhering disks and scour the filtration disk surfaces. The flushing sprays of this prior art do not provide and maintain sufficient energy and disk cleaning activity necessary for many industrial applications.

Further examples cited of the prior art, reference U.S. Pat. Nos. 4,655,910 and 4,655,911, exhibits the flushing efficiency of the directed spray approach, but eliminates much of the mechanical complexity associated with relative movement between the filtration disks and the directed sprays. In these embodiments, within a filter body, a filtration disk stack circumscribes a centralized, rigid element which is secured to the filter body on one end and freestanding on the other. This element is oriented in the axial direction of the disk stack and provides the rigid, lateral support necessary to maintain the cylindrical configuration of the filtration disk stack. An axially movable cap is supported on seal bearing surfaces at the free standing end of this element. When this cap is moved toward the secured end of the rigid element it compresses the filtration disk stack to facilitate filtration. When moved axially away from this position, the compression on the filtration disk stack is relieved and the disk stack is axially opened to facilitate flushing. Located on extended walls of this element are a series of spray nozzles so oriented as to equally impart a tangentially oriented spray upon the disks circumscribing the element. The secured end of the rigid element supports a critical flow check mechanism. During filtration this flow check mechanism directs filtrate flow from internal of the compressed disk stack to a filtrate discharge port exiting the filter. Upon reversing flow of filtrate back through this discharge port into the filter, the critical flow check mechanism directs the reverse flowing filtrate via hollow sections of the rigid element to lift the end cap, thereby decompressing the disk stack. Concurrently, reverse flowing filtrate is also conveyed through hollow sections of the rigid element to the spray nozzles for spray flushing the encircling disks. The similar tangential orientations of the sprays initiate a vigorous rotational spin of the disks about the rigid element. The multiple, axial placement of the spray nozzles and the rotational spin of the disks are intended to convey full flushing spray coverage of the disk stack.

The flow check mechanisms cited in these examples of the prior art have proven to be disadvantageous for several reasons. These flow check mechanisms engender a high pressure drop thereby purveying a substantial hindrance to flow through the filters. Accordingly additional filters and/or high pressure pumps must be employed to facilitate adequate flow. This is expensive and adds further operational complexity. Further, these flow check mechanisms have proven to be unreliable, sensitive to water treatment chemicals and maintenance intensive.

The performance of these embodiments of the prior art show some improvement over the previous lessons of the art, although in many industrial applications they still suffer from inadequate flushing energy and cleaning action upon the solids laden disk filtration surfaces. One specific inadequacy relates to voids of flushing spray upon the disks resulting from axial spacing gaps of the spray nozzles on the rigid element. As a result, the disk stack separates into a series of mini stacks of adhering disks. These disks adhere together because, as a result of spacing gaps between the spray nozzles on the rigid element, no spray impact occurs. These mini stacks are contacted by flush sprays only on the upper surface of the top disk of the mini stack and the lower surface of the bottom disk of the mini stack. Indeed, the presence of a top spray and a bottom spray only, with a void of spray in the middle of the mini stack, actually holds the affected disks together, hindering their separation for cleaning. Flushing efficiency of the sprays is further compromised by the similar orientation of the sprays. Each spray purveys a similar rotational impetus to the disk stack because of the similar tangential orientation of the sprays. Such rotation is intended to facilitate maximum spray coverage of the disk stacks. The disks are motivated by the sprays to rotate in the direction of the sprays. However, because of the common orientation of the sprays, these embodiments suffer from the generation of excessively high rotational speeds of the disks. As the rotational speed of the disks approach the velocity of the spray, the impact energy of the spray upon the disks approaches zero. Cleaning energy and efficiency drop dramatically and the disks do not flush clean.

These embodiments of the prior art employ the movable end cap to facilitate compression and decompression of the disks. The end cap slides down and up, respectively, on sliding sealing surfaces of the end cap and the rigid element. In these examples of the prior art, these sliding surfaces incorporate one or more seals to isolate the filtrate internal to the disk stack from the raw feed-water external to the disk stack. As a consequence of a pressure differential between the internal filtrate side and external dirty water side of the filtration disk stack, dirt, grit and other detritus laden water tends to seep across the sealing surfaces. Inherent to this seepage is a deposition of dirt, grit and other detritus against the high pressure, dirty water side of the sealing surface. As a consequence of the location and abrasive nature of this deposition; abrasion, scoring and eventual sealing failure occurs and the filtrate quality is compromised. Accordingly, these embodiments of the prior art have proven to be unreliable and maintenance intensive.

A further disadvantage of these embodiments of the prior art relate to the configuration of the sprays. The spray nozzles incorporated therein generate a diverging, expanding spray which rapidly drops in energy as it exits the nozzles and contacts the disks. Accordingly the lower spray energies result in an inability for the spray to separate adhering disks as well as purveying an inferior cleansing action to those disks which have separated.

A further disadvantage of these embodiments of the prior art is the requirement of at least two, three-way valves or four, two way valves, externally mounted to a raw water inlet and filtrate outlet of the filters. These valves are necessary to facilitate filtration operations and reverse flushing operations. These valves are expensive, high maintenance mechanisms which are particularly prone to leakage and failure.

In a prior patent granted to this inventor, reference U.S. Pat. No. 6,752,920, there is presented a filter embodiment comprised of three body chambers. One chamber contains a filter disk stack with the internal region of the disk stack ported into a filtrate plenum chamber. The filtrate plenum chamber is ported for filtrate discharge from the filter. A third flush fluid receiving plenum chamber is provided to receive an externally supplied flushing fluid for cleaning the filter disks. The filter disk stack circumscribes several rigid hollow shafts. These shafts are oriented in the axial direction of the filter disk stack and provide lateral support necessary to maintain a cylindrical configuration of the filtration disk stack. Oriented on these shafts, adjacent to the disk stack, is a plurality of nozzle holes wherein a slight majority of the nozzles are configured tangentially in one direction while the remaining, slight minority of the nozzles, are oriented tangentially in an opposing direction. These nozzles provide hydraulic communication between the hollow interior and the exterior of the shafts. The lower ends of the shafts pass, in a rigid, sealed fashion, through the filtrate plenum cavity and terminate within, and in hydraulic communication with, the flush fluid receiving plenum of the filter. The hollow interior sections of these shafts provide a conduit for flow of the cleaning medium from the flush fluid receiving plenum to the nozzles. The ends of the hollow shafts opposite the flush fluid receiving plenum support an axially movable, combined inlet valve seat and disk compression assembly. This assembly moves axially toward the disk stack during filtration to facilitate compression of the disks. During flushing operations, this assembly moves in an axial direction away from the disk stack, thereby releasing the disks for flushing, while concurrently seating in and closing an inlet port to the filter. This assembly further supports a shaft which is directed axially opposite to the inlet valve seat and disk compression assembly and extends into the filtrate plenum. The free end of this shaft supports a block valve located within the plenum chamber. While in the filtration mode, the combined inlet valve seat and disk compression assembly is compressed against the disks and the shaft moves the block valve into an open position facilitating communication between the interior filtrate volume of the disk stack and the filtrate plenum. During flushing operations, the flushing fluid is introduced, under pressure, into the flush fluid receiving chamber. The pressured fluid moves through the hollow shafts supporting the disks and motivates the inlet valve seat and disk compression assembly away from the disks and into a sealing position on the inlet port. Concurrently, the flushing fluid expels from the nozzles and impacts, in a cleansing fashion, across the filtration surfaces of the disks. The disks rotate at a low speed in the direction imposed by the slight majority of the nozzles. The spray from these nozzles impacts the disks in a head on fashion thereby providing an optimum spray cleaning performance.

This embodiment of the art provides substantially improved cleaning performance as a result of multi-directional nozzle orientations, reduced pressure drop by not requiring any check valves and the ability to employ an exterior, higher pressure, source of cleaning fluid. Further, the disadvantages associated with the required inlet and outlet valves of the prior art are eliminated. Though the performance improvements heralded by this prior art of this inventor were extraordinary, several disadvantages still remained to be addressed. One of these problems was the adherence of adjacent disks due to sticky collected solids and the consequential inability to flush clean the closed disk surfaces. These problems relate to both the fore-mentioned void spaces on the disk stack resulting from rigidly mounted spray nozzles and from the reduced flushing energy associated with diverging sprays exiting the nozzles. Another disadvantage of this prior embodiment of the art by the inventor, is the unreliability and maintenance required of moving seals on the disk compression end cap assembly in the presence of abrasive solids in the raw feed-water to the filter. Another disadvantage is the requirement of a flush valve to control the inlet of flushing fluids. This valve must be of sufficient size to accommodate the high flow rates required for efficient flushing and cleaning of the disks. As a consequence, the size and cost of this valve is substantial. Further, if chemicals are employed in the flushing fluid, the materials of construction of this valve must be resistant to these normally harsh chemicals. Such exotic materials add substantially to the cost of the valve. The disadvantages of the flush valve in this prior art of the inventor are numerous.

Another disadvantage of this latest example of the prior art corresponds to sliding seals which are required in the movable valve seat and disk compression assembly. These sliding seals are necessary to separate the filtrate internal to the filtration disk stack from the dirty, pre-filtered water external to the filtration disk stack. As a consequence of a pressure differential between the internal filtrate side and external dirty water side of the filtration disk stack, dirt, grit and other detritus laden water tends to seep across the sealing surfaces. Inherent to this seepage is a deposition of dirt, grit and other detritus against the high pressure, dirty water side of the sealing surface. The location and abrasive nature of this deposit results in an eventual failure of the seals, thereby compromising the filtrate quality.

The disk flushing procedures of the prior art have generally employed filtrate for flushing operation. For those applications in which the available filtrate is of insufficient pressure, external pressurized filtrate or other flushing fluid sources have been employed. Applications of the prior art have employed municipal water, pump pressurized filtrate and compressed air sources in an air over water approach to develop pressure for flushing. High externally supplied pressures generally improve flushing performance however, frictional pressure losses internal to the filters, throttling pressure losses through valves, throttling pressure losses through flush nozzles and energy loss through diverging spray patterns all dramatically reduce the flushing energy exerted upon the solids laden disk filtration surfaces. As a consequence, in many industrial applications, the employment of these alternative high pressure flushing processes is still insufficient to provide satisfactory cleaning of the filtration surfaces. Consequently, to facilitate effective filtration disk cleaning in such circumstances, the filters of the prior art must be dismantled and the disks removed and chemically washed. This is a labor intensive, time consuming, costly and inefficient process.

A further disadvantage in the prior art relates to the inability to readily employ chemicals beneficial for cleaning of the filtration disks. Often in industrial applications, solids adhere to the disks with such tenacity that chemicals must be employed to adequately clean the filtration disks. In order to facilitate such cleaning, the filters of the prior art must be dismantled and the disks removed and chemically washed. This is a labor intensive, time consuming, costly and inefficient process.

Industrial applications often result in a deposition of solids upon the filtration disk surfaces which require elevated temperatures for effective cleaning. A disadvantage of the prior art is that there are no ready provisions to facilitate flushing of the filtration disks at elevated temperatures. Those industrial applications in which elevated temperatures are necessary for adequate filtration disk cleaning either require the employ of an isolated, heated, high pressure cleaning fluid source or dismantling of the filters, removal of the filtration disks and external washing of the filtration disks at an elevated temperature. This is a labor intensive, time consuming, costly and inefficient process.

In a similar fashion, there are many industrial applications wherein the only method for successful cleaning of the filtration disks requires cleaning with chemicals at elevated temperatures. The prior art teaches no ready options for this procedure other than flush fluids supplied by external, heated tankage or dismantling of the filter, removal and elevated temperature chemical cleaning of the filtration disks. This is a labor intensive, time consuming and inefficient process.

Another disadvantage of the prior art is biotic plugging and fouling of the filtration disks. This problem arises from biological growth developing on the filtration disk surfaces. This common problem presents a substantial impediment to cleaning of the filtration disks. Further, the problem continues even after apparently successful flushing as a consequence of the growth of residual biotic cultures remaining on the disks. There are no methods taught by the prior art to resolve these problem other than dismantling of the filter, removal, cleaning and sterilization of the disks and any other effected internal structures by chemical, thermal or combined means. This is a labor intensive, time consuming, costly and inefficient process.

OBJECTS AND ADVANTAGES

The goal of this invention is to purvey the advantages of disk filtration processes into industrial applications. Affiliated goals of the invention are to provide resolution of unreliability, high maintenance, filtrate contamination and excessive waste volume discharge problems associated with industrial application of the disk filtration processes of the prior art. Achieved goals of this invention are elimination of the unreliability, high maintenance and filtrate contamination problems associated with the common seal failures of the prior art. A further goal, plying achieved superiority over the prior art, is elimination of the poor performance, high maintenance and excessive waste discharge volumes resulting from adherence and incomplete flushing of adjacent filtration disks as well as from insufficient flushing and cleaning energy acting upon the filtration disks. Further, heterogeneous flushing and cleaning patterns common to the prior art are eliminated, thereby facilitating improved performance goals, higher reliability goals and an increasingly important industrial goal of generating less waste fluids requiring discharge. Further, as an attendant benefit, the invention provides enhanced reliability and performance for agricultural applications.

An object of the invention is to provide a means to enhance separation of adhering adjacent disks to facilitate effective flushing and cleaning performance.

A further object of the invention is provide a means to eliminate heterogeneous flushing spray patterns and associated contact voids as are prevalent in the prior art. This object is most especially purveyed during initial decompression of filtration disk stacks prior to flushing and cleaning.

An additional important object of the invention is to provide reliable and maintenance free performance. Critical to this object is elimination of seals in dirty water sections of disk filters, thereby eliminating this common source of failure in the prior art.

A further object of this invention is to eliminate requirements for expensive and failure prone high pressure, high volume flushing valves which are necessary in external pressured flushing embodiments of the prior art. These valves are expensive as well as being prone to both mechanical wear and chemical damage in the presence of aggressive disk cleaning chemicals. The object is to eliminate capital and maintenance expenses associated with this valve, while improving reliability and permitting unimpeded employment of aggressive chemicals to improve filtration disk cleansing efficiency. Additionally, process downtime is reduced as a further consequence of elimination of the maintenance intensive, unreliable and expensive, high pressure and high volume flushing valve. An additional advantage is a capability to employ aggressive chemicals without concern of damage to the flushing valve.

A further object of the invention is to provide a means to maintain high energy in cleaning fluids as they pass through filter internals and impact upon solids laden filtration disks. Such high energy assures maximum jetting and cleansing action of the cleaning fluids upon and across the solids laden filtration disk surfaces. An advantage provided therein being improved cleaning efficiency of the filtration disks and a resultant reduction of required cleaning frequency. Reduction of the cleaning frequency further affords abatement of wear and tear on the filtration equipment, reduction of cleaning waste volume and improved filtration throughput. Further, with improved cleansing efficiency, labor, expenses and process downtime associated with disassembly, removal and manual cleaning of the filtration disks is substantially reduced or eliminated. As a further advantage, an ability to maintain substantially higher pressure during cleansing of the disks affords application of disk filtration technology to many industrial applications for which disk filtration embodiments of the prior art cannot serve.

A further object of the invention is to provide a means to readily employ chemicals for enhancement of filtration disk cleaning operations. These chemicals enhance disk cleansing efficiency thereby reducing required cleaning frequencies. Reduced cleaning frequencies are advantageous in reducing wear and tear on filtration equipment, reducing cleaning waste volume and improving filtration throughput. Further, with improved cleaning efficiency, labor, expense and process downtime associated with disassembly, removal and manual cleaning of filtration disks can be substantially reduced or eliminated. As a further advantage, an ability to employ chemical cleaning affords application of disk filtration technology to many industrial applications for which disk filtration embodiments of the prior art cannot be employed.

An additional object of the invention is to provide a means to facilitate cleansing of filtration disks at an elevated temperature. Advantages inherent to this goal are dramatic improvement in cleaning efficiency of filtration disks in those applications for which elevated temperatures are necessary for adequate cleaning. The invention affords an advantage of readily employing elevated temperatures to promote enhanced disk cleaning. Consequently, expenses otherwise associated with labor and process downtime accompanying disassembly, removal and manual cleaning of filtration disks of the prior art, can be substantially reduced or eliminated. A further advantage of the invention is affording employment of disk filtration processes to those industrial applications in which cleaning of disk surfaces requires elevated temperatures.

An additional object of the invention is to provide a means to facilitate chemically enhanced filtration disk cleaning at elevated temperatures. Advantages inherent to this objective are dramatic improvement in cleansing efficiency of the filtration disks for those applications wherein both chemicals and elevated temperatures are necessary to adequately dean the disks. The invention readily affords the advantage of employing both chemicals and elevated temperatures to facilitate enhanced cleaning of the disks. Consequently expenses, otherwise associated with labor and process downtime accompanying disassembly, removal and manual cleaning of the filtration disks of the prior art, can be substantially reduced or eliminated. A further advantage of the invention is affording ready use of disk filtration processes in those applications for which disk filtration, as taught in the prior art, cannot be employed due to plugging with solids which can only be removed through employment of chemicals at elevated temperatures.

An additional object of the invention is to provide a ready means to chemically eliminate biotic fouling and plugging of filtration disks. Implementation of this objective facilitates both cleaning of filtration disks of organic as well as other materials and sterilization of the filtration disks and other filter internals. Sterilization reduces tendencies for biotic fouling. The invention provides a unique and advantageous ability to chemically sterilize by ready inclusion of sterilizing chemicals in filter disk cleansing fluids. This affords concurrent cleaning and sterilization of the filtration disks thereby improving performance and reducing required cleaning frequencies. Reduced cleaning frequency is advantageous in curtailing wear and tear on filtration equipment, minimizing cleaning waste volume and improving filtration throughput. Further, by employing chemical sterilization to eliminate biotic solids build-up, expenses associated with labor and process downtime accompanying disassembly, removal and manual cleaning of the filtration disks of the prior art, can be substantially reduced or eliminated. Additionally, the invention makes available beneficial use of disk filtration processes to those industrial applications in which biotic fouling precludes employment of the prior art.

A further object of the invention is to provide a ready means to thermally eliminate biotic fouling and plugging of filtration disks. Implementation of this objective facilitates both cleaning of the filtration disks of biotic as well as other materials and sterilization of the filter disks and other filter unit internals. Sterilization reduces tendencies for future biotic fouling. The invention provides an advantageous option to thermally sterilize by cleaning with fluids at sufficiently elevated temperatures to destroy biotic cultures on the filtration disks or other internal components of the filter unit. This advantage promotes concurrent cleansing and sterilization of the filtration disks, thereby reducing cleaning frequency. Reduction of the cleaning frequency is advantageous in reducing wear and tear on filtration equipment, minimizing cleaning waste volume and improving filtration throughput. Further, with elimination of biotic solids build-up, labor, expense and downtime associated with disassembly, removal and manual cleaning of the filtration disks can be eliminated or at least substantially reduced. Additionally, the invention makes available beneficial use of disk filtration processes to those industrial applications in which biotic fouling precludes the use of the disk filtration embodiments of the prior art.

DRAWING FIGURES

Figure 5:
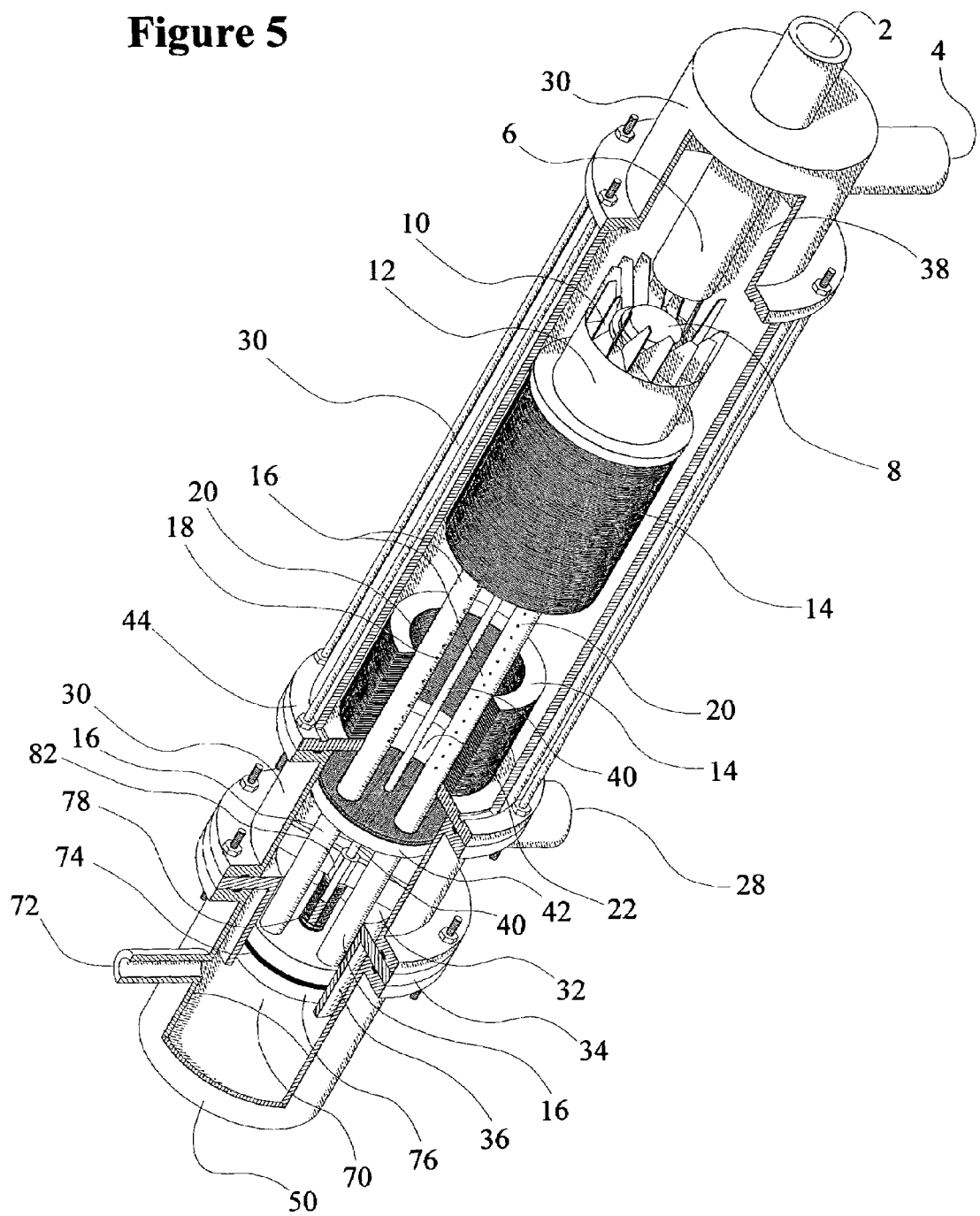

FIG. 5 is a top perspective view of an embodiment of the invention, illustrated as operating in a filtration mode. This embodiment incorporates an integral valve arrangement as defined in the inventor's previous patent; reference U.S. Pat. No. 6,752,920.

Figure 6:
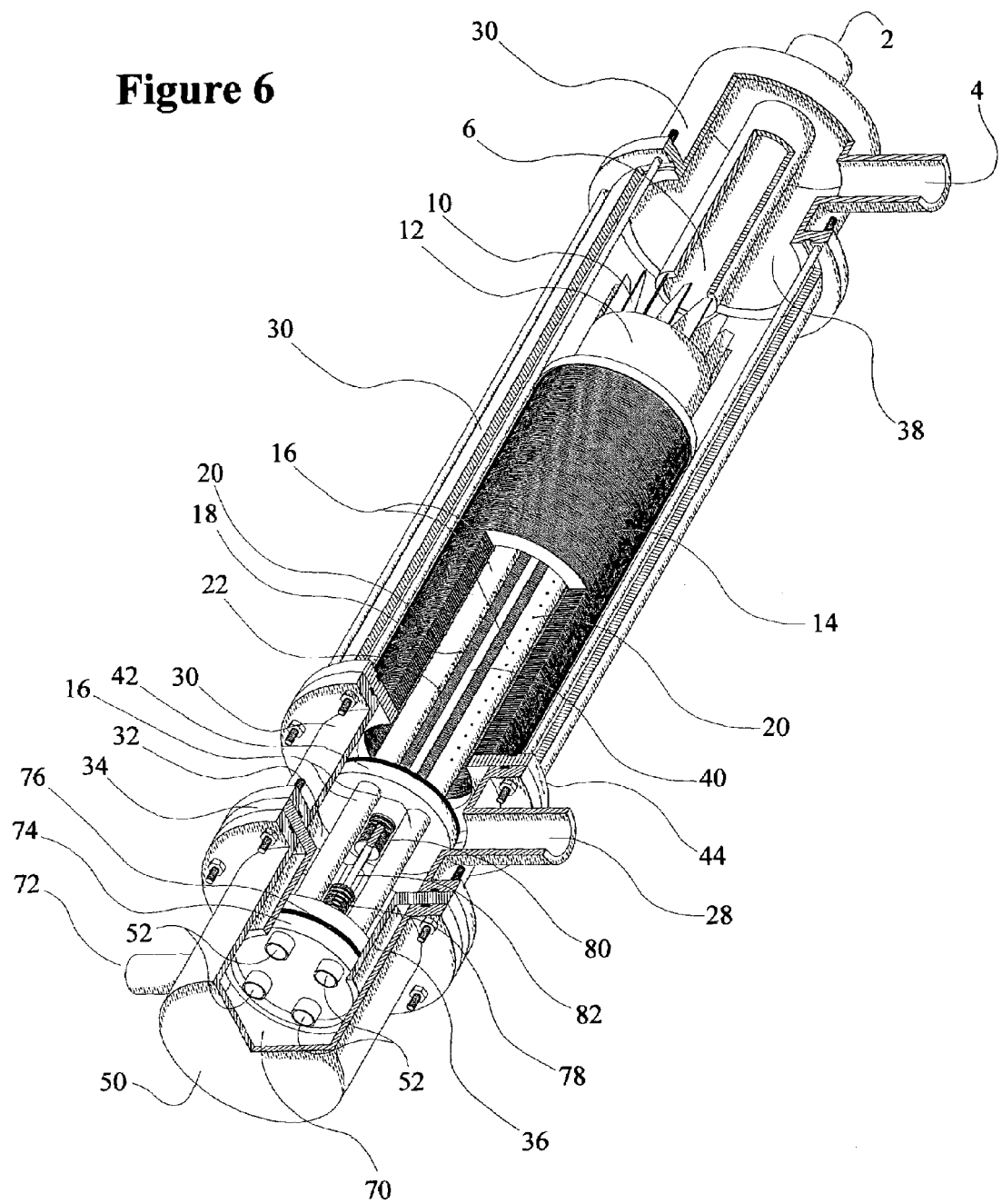

FIG. 6 is a bottom perspective view of an embodiment of the invention, illustrated as operating in a filtration mode. This embodiment incorporates an integral valve arrangement as defined in the inventor's previous patent; reference U.S. Pat. No. 6,752,920.

Figure 7:
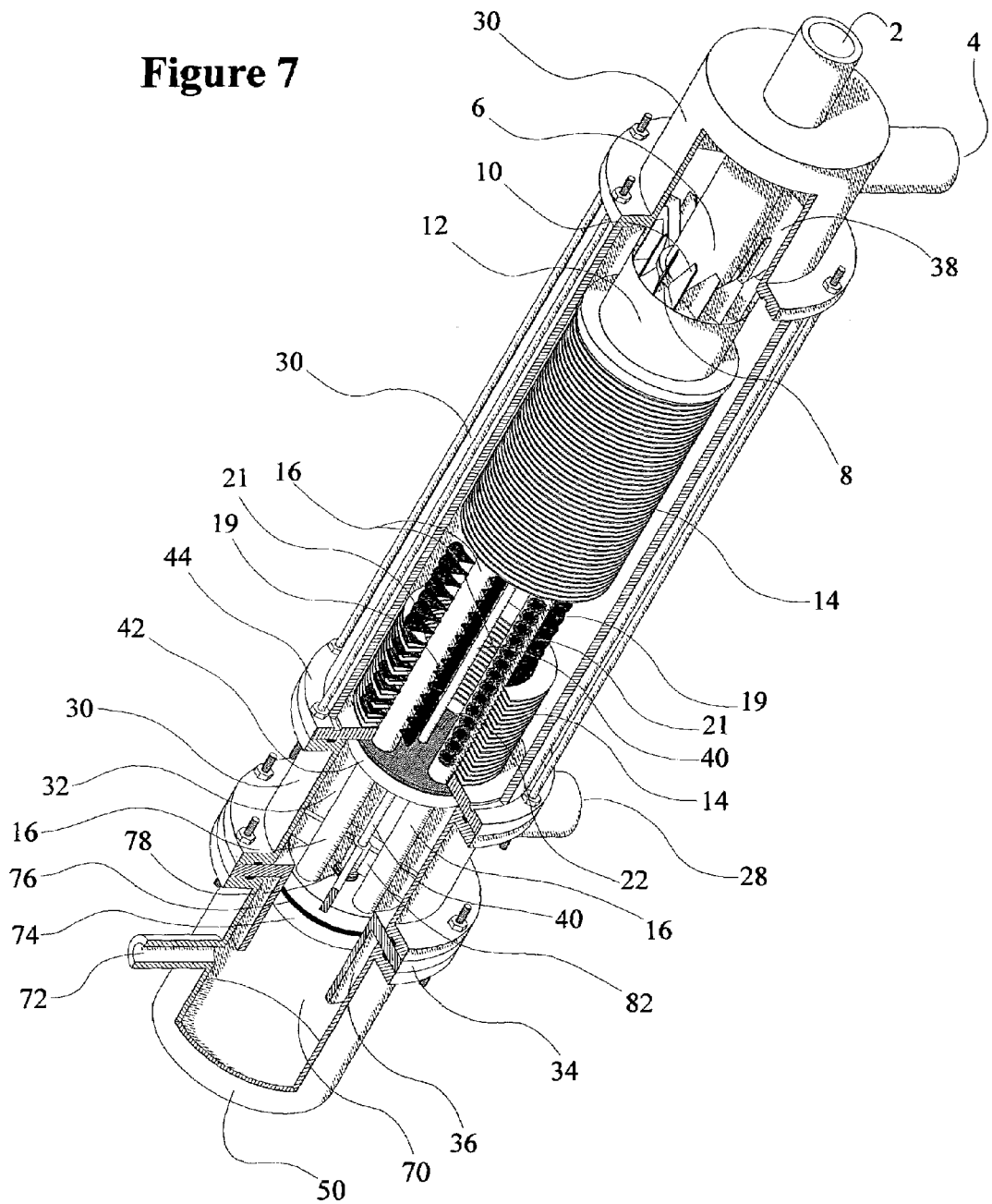

FIG. 7 is a top perspective view of an embodiment of the invention, illustrated as operating in a flushing, cleaning mode. This embodiment incorporates an integral valve arrangement as defined in the inventor's previous patent; reference U.S. Pat. No. 6,752,920.

Figure 8:
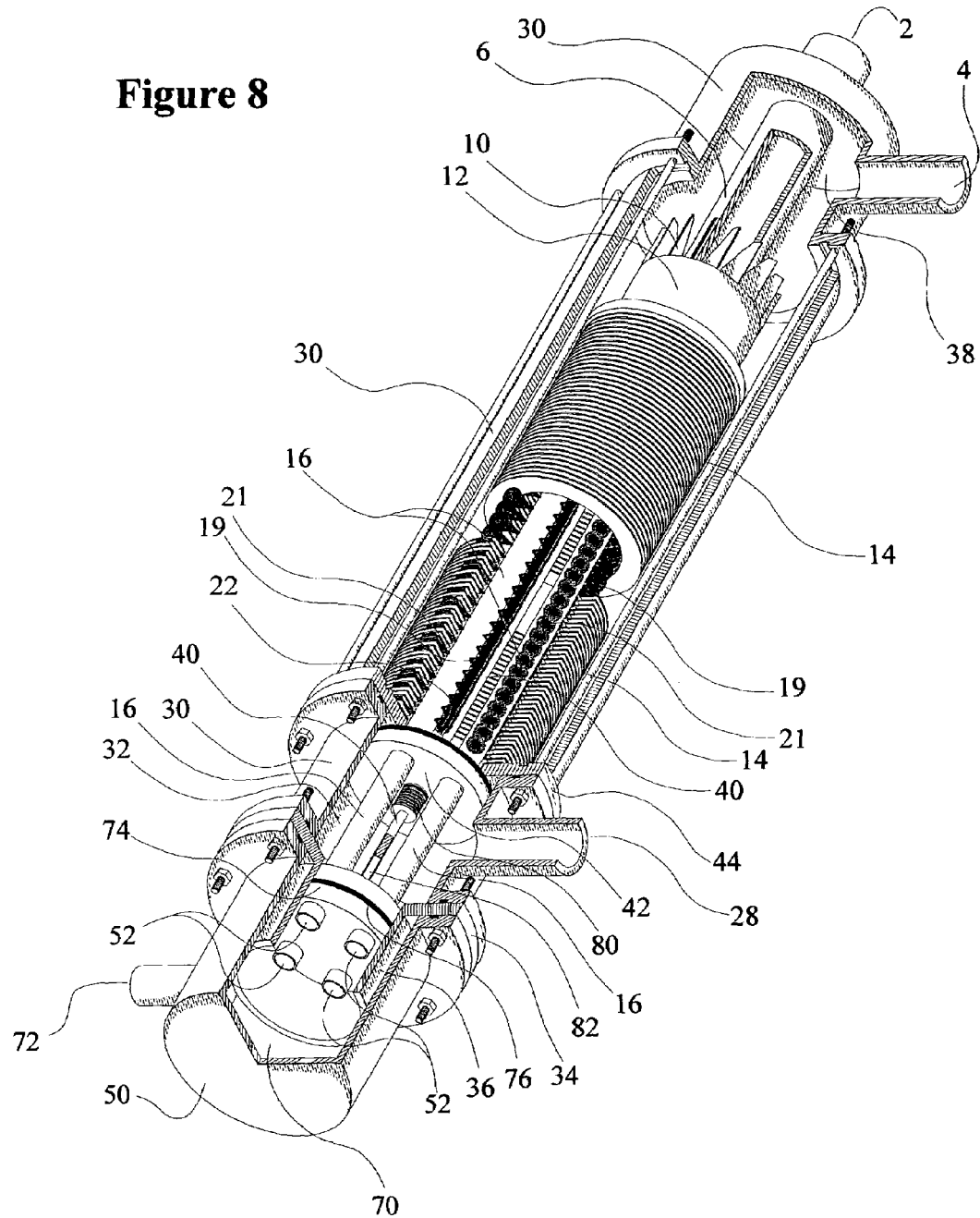

FIG. 8 is a bottom perspective view of an embodiment of the invention, illustrated as operating in a flushing, cleaning mode. This embodiment incorporates an integral valve arrangement as defined in the inventor's previous patent; reference U.S. Pat. No. 6,752,920.

Figure 9:
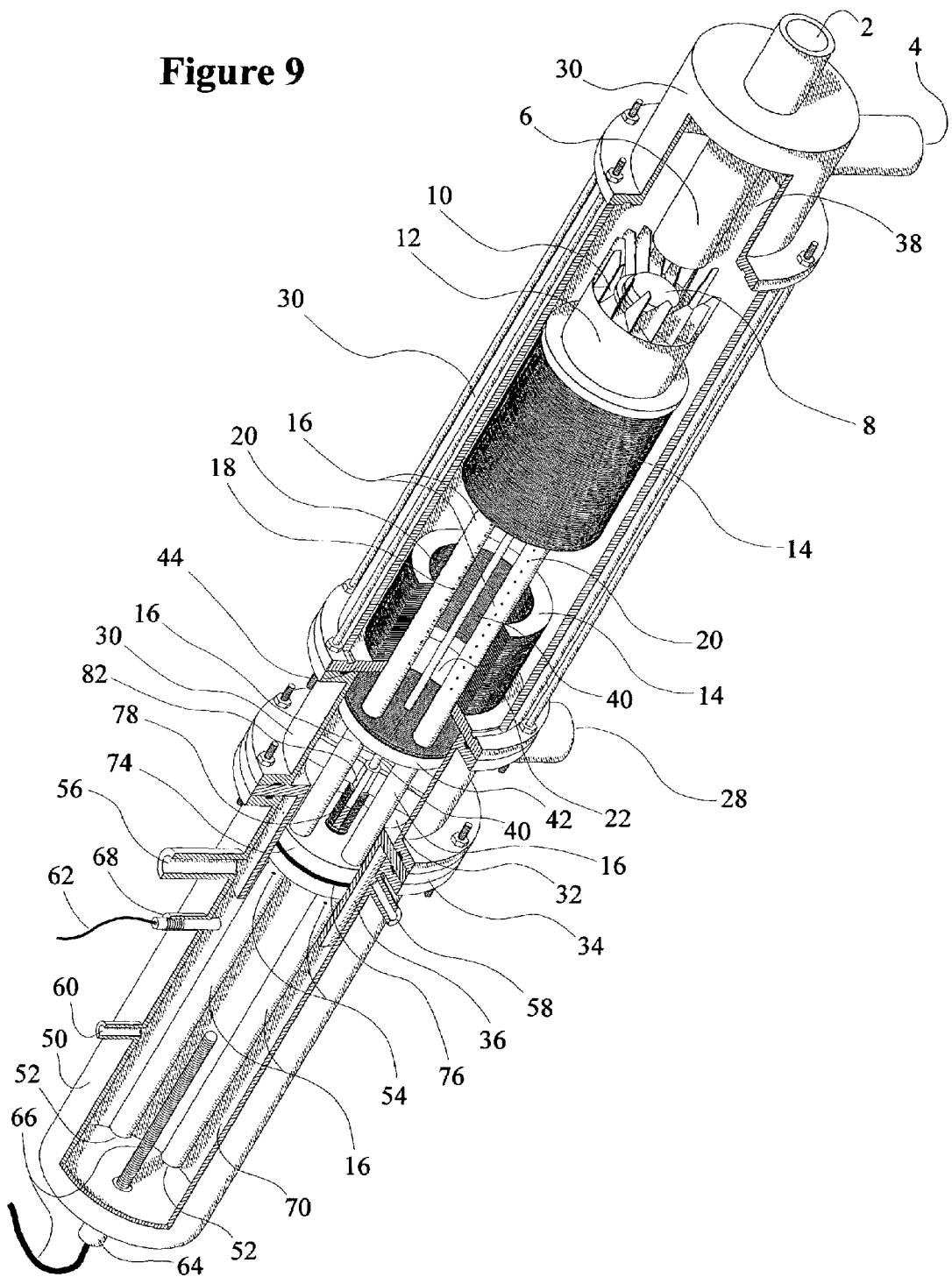

FIG. 9 is a top perspective view of the preferred embodiment of the invention, illustrated as operating in a filtration mode. This preferred embodiment facilitates collection, chemical treatment, heating and storage of filtrate for later use as a disk flushing and cleaning fluid.

Figure 10:
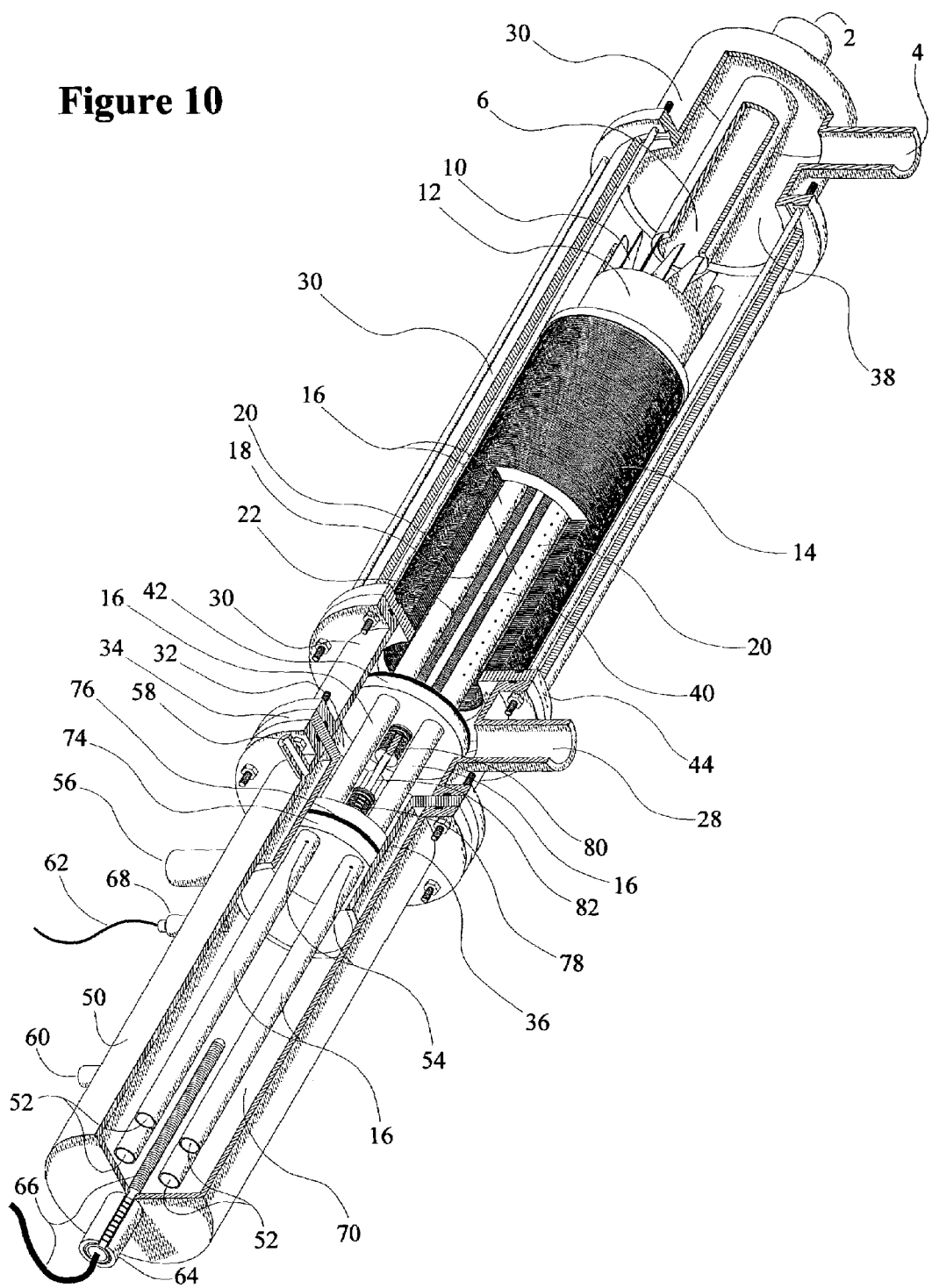

FIG. 10 is a bottom perspective view of the preferred embodiment of the invention, illustrated as operating in a filtration mode. This preferred embodiment facilitates collection, chemical treatment, heating and storage of filtrate for later use as a disk flushing and cleaning fluid.

Figure 11:
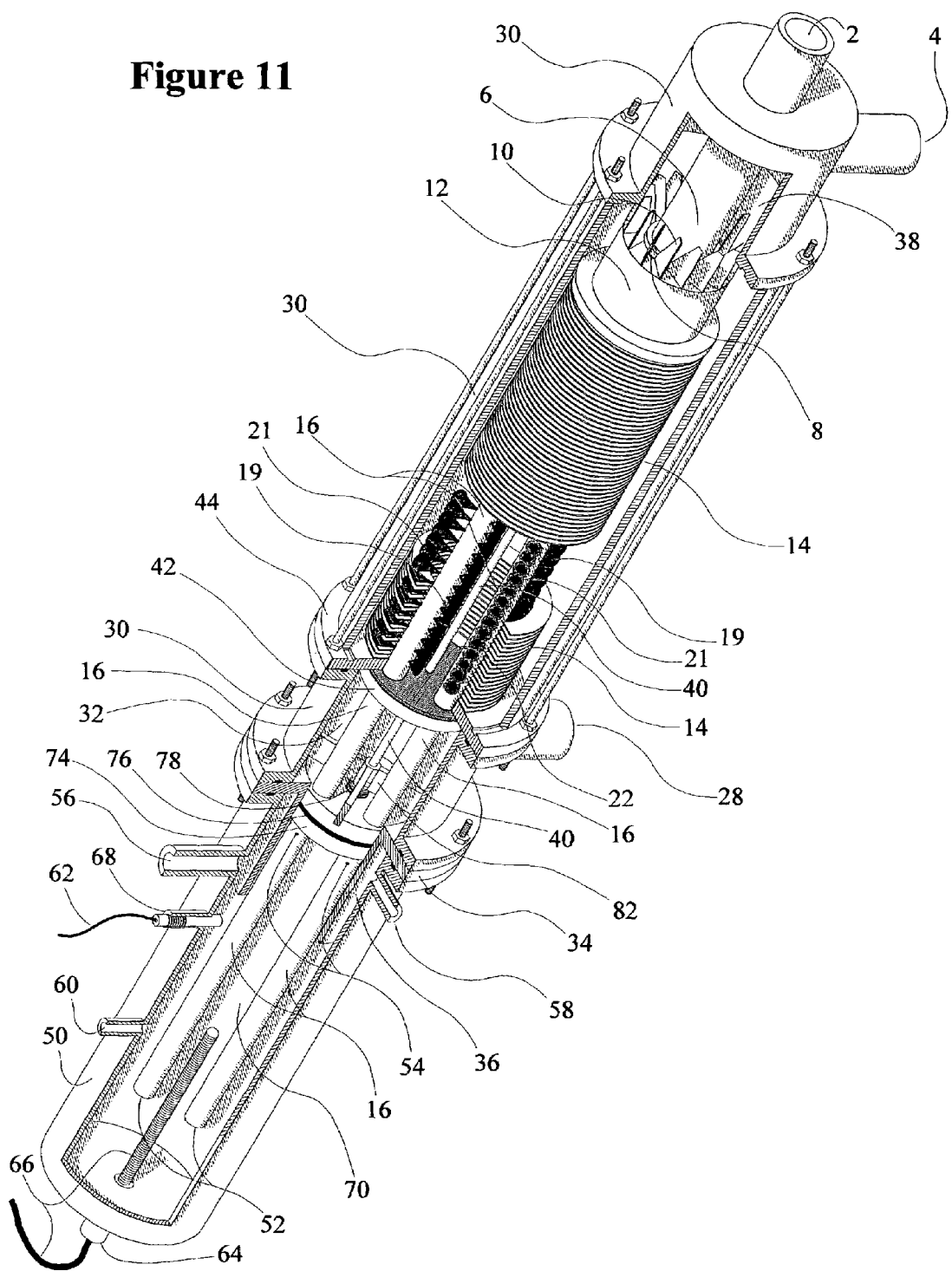

FIG. 11 is a top perspective view of the preferred embodiment of the invention, illustrated as operating in a flushing, cleaning mode. This preferred embodiment of the invention employs a pressured gas charge to activate and sustain cleaning and flushing operations of the filtration disks using previously collected, stored, chemically treated and heated filtrate. The flushing and cleaning operation is further enhanced by the atomization and entrainment of a fraction of the pressured gas charge into the chemically treated and heated filtrate.

Figure 12:
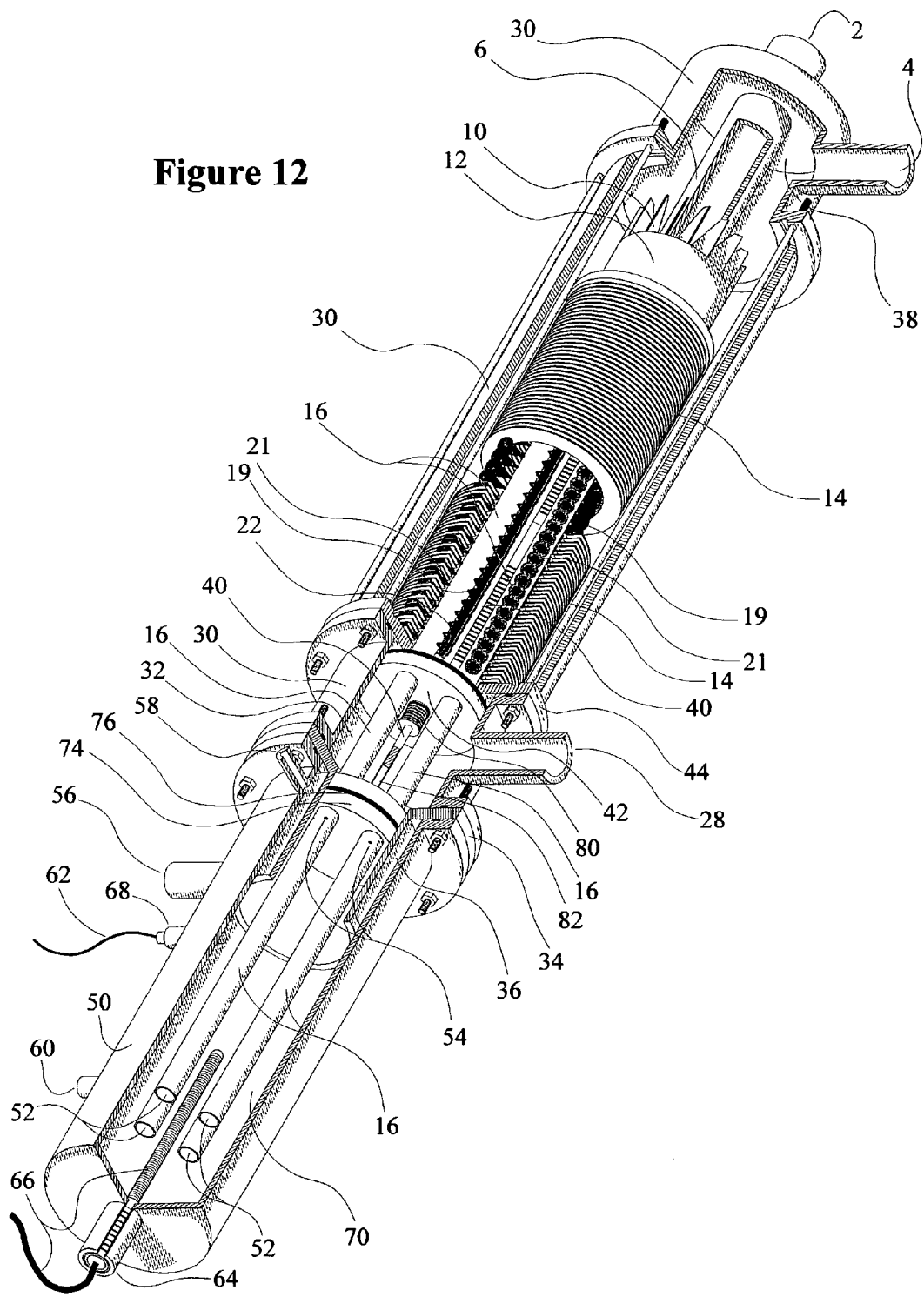

FIG. 12 is a bottom perspective view of a preferred embodiment of the invention, illustrated as operating in a flushing, cleaning mode. This preferred embodiment of the invention a pressured gas charge to activate and sustain cleaning and flushing operations of the filtration disks using previously collected, stored, chemically treated and heated filtrate. The flushing and cleaning operation is further enhanced by the atomization and entrainment of a fraction of the pressured gas charge into the chemically treated and heated filtrate.

Figure 13:
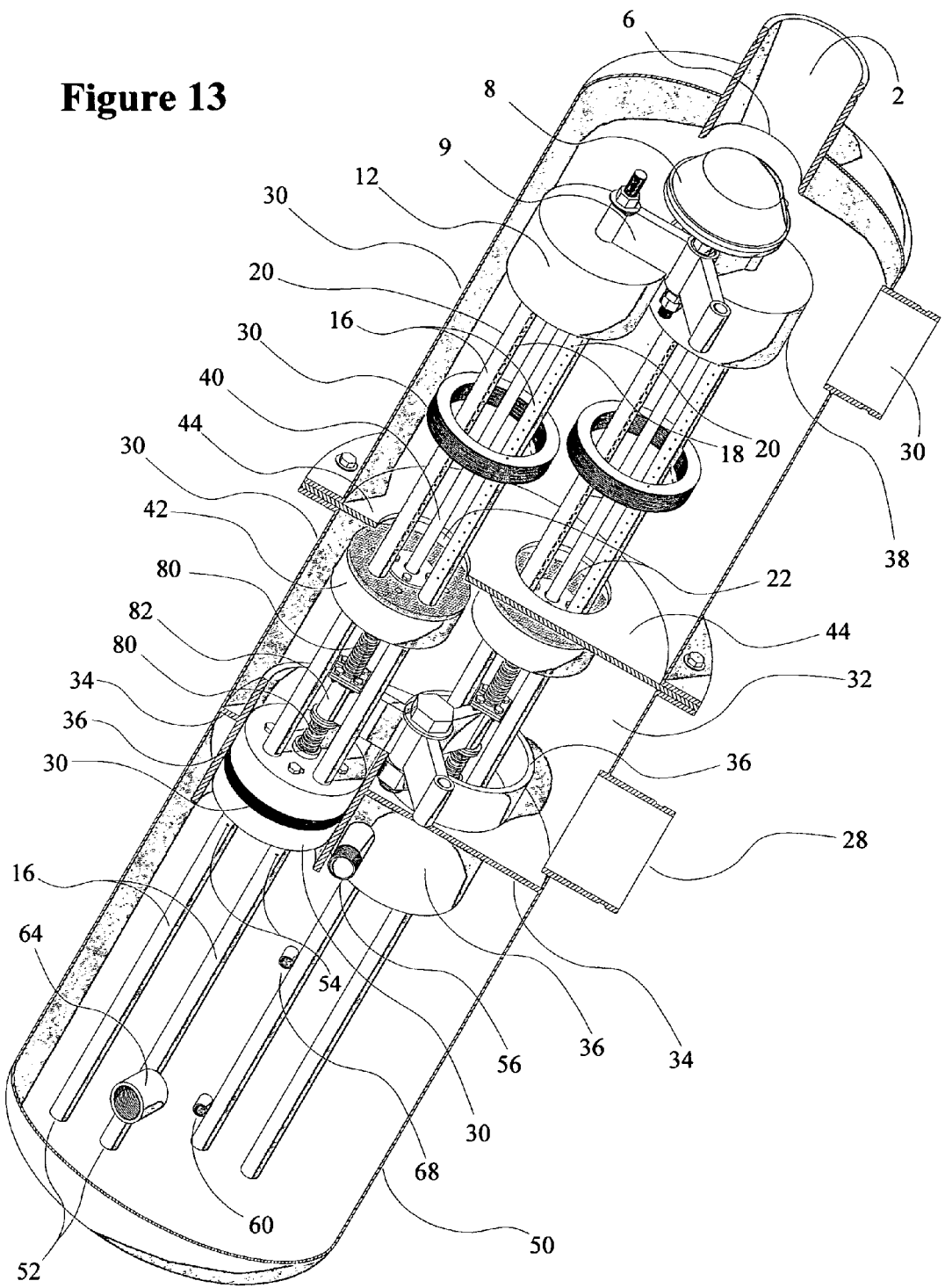

FIG. 13 is a frontal, top perspective, exploded view of a multiple filtration disk stack embodiment of the invention, illustrated as operating in a filtration mode. This figure illustrates the embodiment with one of three filtration disk stacks and associated assemblies removed for clarity. This embodiment incorporates an integral valve arrangement as defined in the inventor's previous patent; reference U.S. Pat. No. 6,752,920. This embodiment of the invention employs a pressured gas charge to activate and sustain cleaning and flushing operations of the filtration disks using previously collected, stored, chemically treated and heated filtrate. The flushing and cleaning operation is further enhanced by the atomization and entrainment of a fraction of the pressured gas charge into chemically treated and heated filtrate.

REFERENCE NUMERALS IN THE DRAWING

2 Unfiltered fluid inlet
4 Outlet for flushing and cleaning waste

6 Inlet port
8 Inlet port valve seat
9 Multi stack inlet valve support web
10 Centrifugal inlet impeller
12 Disk compression block
14 Disk filtration element stack
16 Sparger support tubes
18 Right hand rotation oriented orifice
19 Right hand rotation oriented spray jet
20 Left hand rotation oriented orifice
21 Left hand rotation oriented spray jet
22 Disk filtration stack filtrate port
28 Filtrate product outlet
30 Filter body
32 Filtrate plenum
34 Activation cylinder support
36 Activation cylinder
38 Waste discharge plenum
40 Connecting shaft
42 Filtrate valve block
44 Disk filter stack support base
50 Filtrate immersion body
52 Open lower ends of sparger tubes
54 Controlled entry pressured gas entrainment orifice
56 Pressured gas inlet
58 Gas vent
60 Chemical feed port
62 Immersion filtrate chemistry monitoring sensor
64 Heating element port
66 Immersion filtrate heating element
68 Chemical sensor port
70 Immersion chamber
72 High pressure flushing fluid inlet
74 Activation piston
76 Activation piston seal
78 Activation piston spring
80 Filtrate block valve spring
82 Activation piston spring support

BRIEF SUMMARY OF THE INVENTION

Summarily, in accordance with the foregoing and other broad aspects of the invention, there is provided by the specifications of this patent a means for reliable, industrial grade disk filtration. The filtration art, as described herein, employs a unique and novel approach wherein a spring loaded, axially mobile, activation piston and seal, laterally supported within an activation cylinder, penetrated by and securing, in a co-moving fashion, sparger support tubes which further rigidly supports, in a co-moving fashion, a filtration disk compression block, immersed in clean filtrate within confines of an immersion chamber further affixed with a compressed gas port provided for flushing operations. The immersion chamber receives filtrate from a disk filtration stack via orifices in the sparger support tubes which further provide both lateral and compressive support, via tension on an affixed disk compression block, to the filtration disk stack. Spring force on the piston affords compression of the disk stack for filtration. Compressed gas is ported to the immersion chamber for flushing. The associated pressure counteracts the spring force and drives the piston and attached sparger support and disk compression block outward which decompressing the disks for cleaning. The gas pressure forces the immersion chamber fluid through the sparger support tubes where it exits the orifices as hydraulic jets so configured that the ven-contracta impacts upon and separates the decompressed disks. Adjacent to, and on the immersion chamber side of the activation piston are gas entrainment orifices in the sparger support tubes. These orifices are so configured to facilitate entrainment of high pressure gas into the fluid conveyed within the sparger support tubes after sufficient vena-contracta separation of the disks has occurred. The gas entrained fluid impacts upon the opened disks in a high energy dispersed scouring action, to actively flush the disk clean.

Upon drainage of the immersion chamber, the compressed gas and associated pressure in the immersion chamber is released. The spring force upon the activation piston drives it back into the activation cylinder, in the direction of the immersion chamber, facilitating reset of the sparger support tubes and disk compression block in the filtration position.

Further features and advantages of the invention will be apparent to those knowledgeable in the art by reference to the illustrations and associated elucidations supporting several embodiments of the art as follows.

FIGURE DESCRIPTIONS

Figure 1:
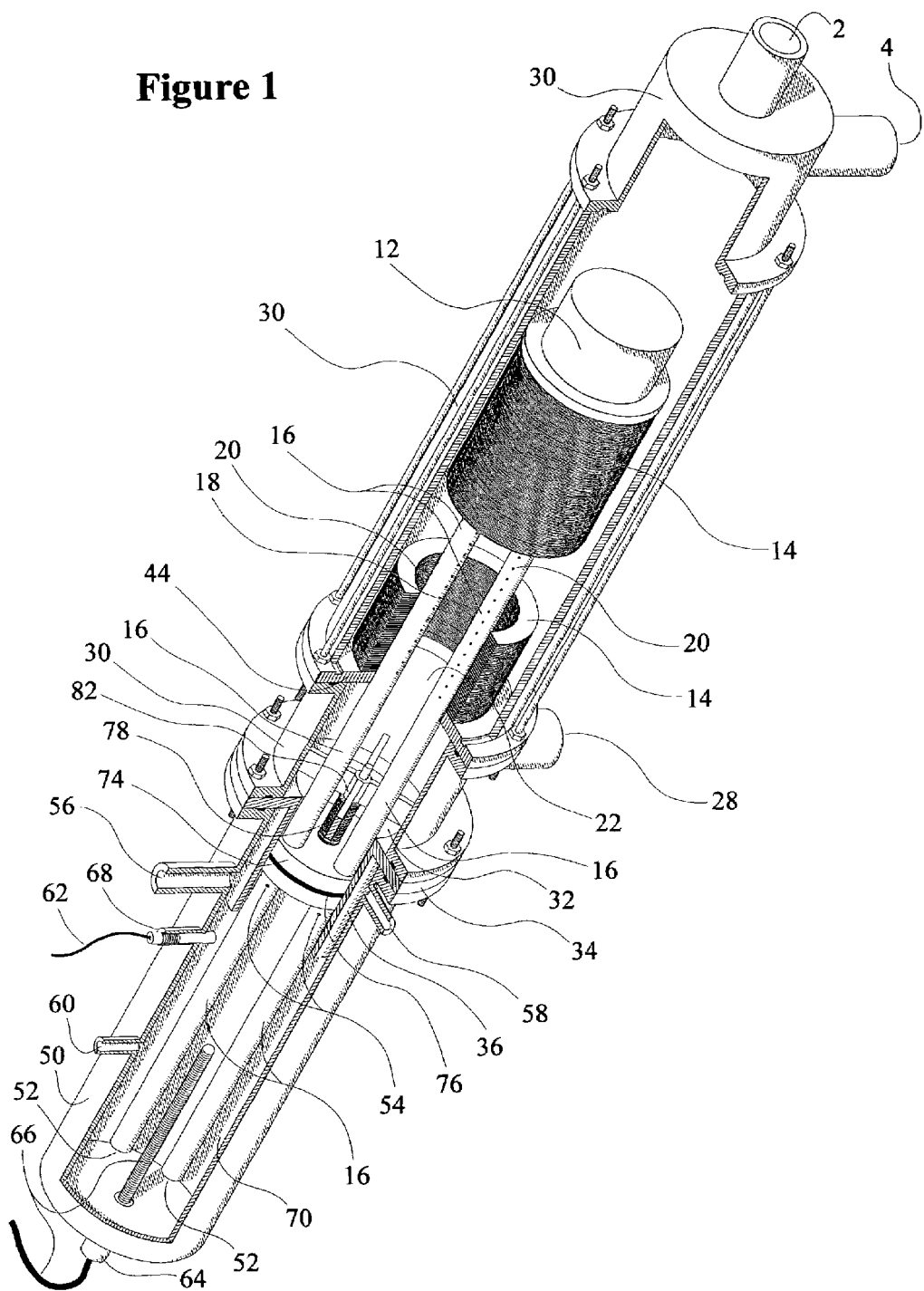
FIG. 1 is a top perspective view of an embodiment of the invention, illustrated as operating in a filtration mode.
Figure 2:
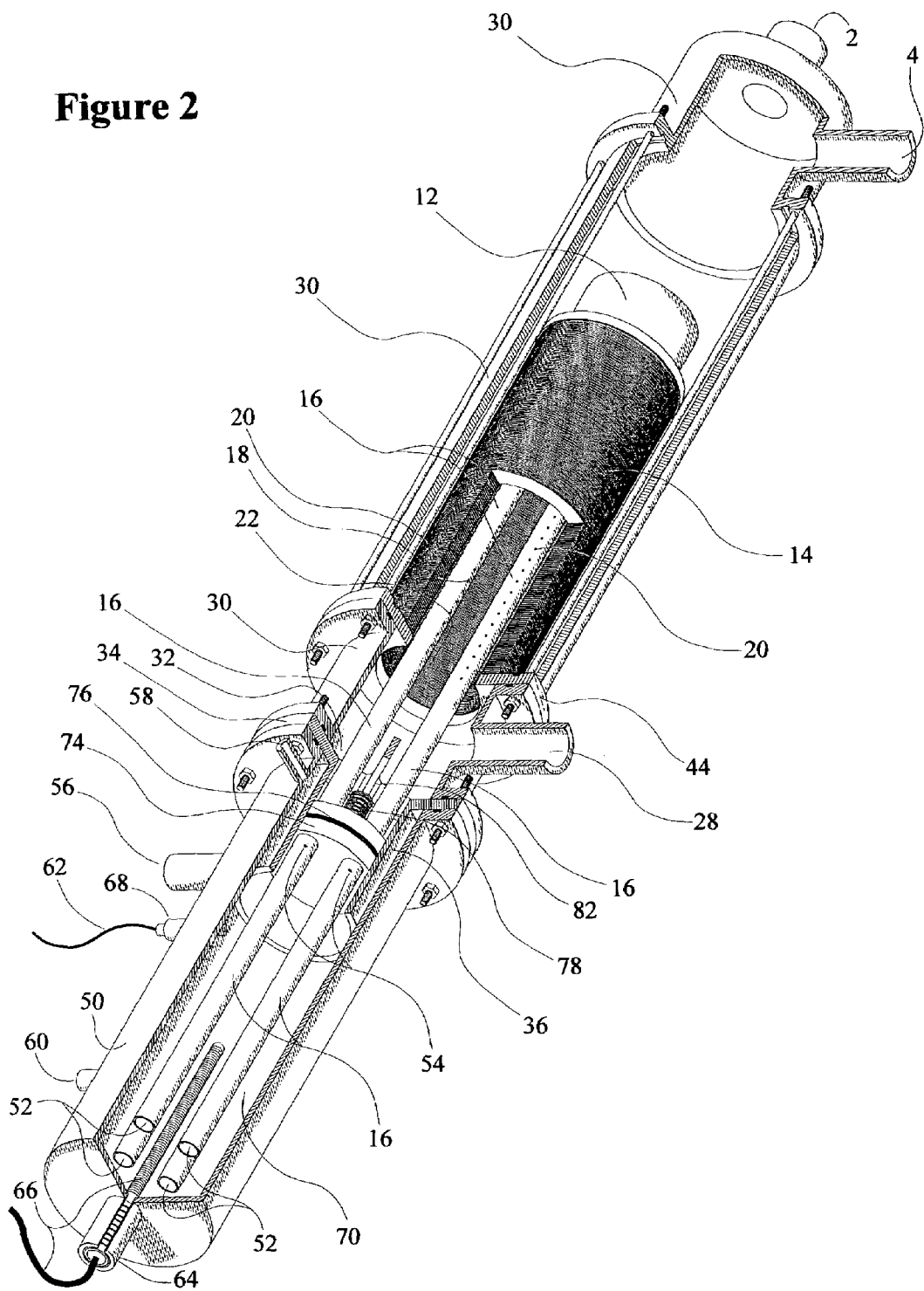
FIG. 2 is a bottom perspective view of an embodiment of the invention, illustrated as operating in a filtration mode.

Description—FIGS. 1 and 2

Direct to obtaining the effect of the invention, a simple embodiment of the invention, operating in the filtration mode, is illustrated in perspective on FIG. 1 as a prospective to the upstream view and FIG. 2 as a prospective to the downstream view. The invention, as illustrated, is configured for service employing external fluid control valves, which are not shown. Operational definition of this simple embodiment is as follows.

Mechanically this embodiment consists of two primary component bodies with conveyances for ingress and egress. The two primary component bodies are a filter body 30 and a filtrate immersion body 50. The filter body 30 includes an unfiltered fluid inlet 2, an outlet for flushing and cleaning waste 4 and a filtrate product outlet 28. The filtrate immersion body 50 includes a pressured gas inlet 56, a gas vent 58, an optional chemical feed port 60, an optional chemical sensor port 68 employing an immersion filtrate chemistry monitoring sensor 62 and an optional heating element port 64 employing an immersion filtrate heating element 66.

Internally, an upstream end of a filtration disk stack 14 is sealed by a disk compression block 12 in a compressed filtration mode position. The disk compression block 12 is rigidly attached to four sparger support tubes 16. The downstream end of the filtration disk stack 14 is sealed by a disk support base 44. The filtration disk stack 14 is laterally supported by the four sparger support tubes 16. The filtration disk stack 14 is held in compression by tension in the sparger support tubes 16 pulling downward upon the attached disk compression block 12. The sparger support tubes 16 pass through, but are rigidly affixed to an activation piston 74. This piston and associated seal 76 are laterally supported by an activation cylinder 36 which is affixed within the confines of an immersion chamber 70 defined internal to the filtrate immersion body 50. The activation cylinder 36 is supported to the filtrate immersion body 50 via the activation cylinder support 34. The activation piston 74 is held under the force of an activation piston spring 78 in a downward, toward the immersion chamber 70, direction. The activation piston spring 78 is supported in compression mode by a rigidly mounted activation piston spring support 82. The activation piston spring 78 forces tension in the sparger support tubes 16 which pull the disk compression block 12 downward in compressive contact with the filtration disk stack 14. Thereby providing the compressive force required during filtration.

The sparger support tubes 16 are attached to, but penetrate through the activation piston 74. Controlled entry pressured gas entrainment orifices 54 penetrate the sparger support tubes immediately below the activation piston 74 within the confines of the activation cylinder 36. The sparger support tubes 16 extend, with open ends 52, nearly to the base of the immersion chamber 70.

In filtration operation, unfiltered fluid is introduced, under pressure, into the filter body 30 via inlet 2. The unfiltered fluid passes through an annular space between an interior surface of the filter body 30 and external to the surface of the filtration disk stack 14. The fluid passes into the filtration disk stack 14 and accedes to the internal volume of the filtration disk stack 14 as a filtrate. The majority of the filtrate exits the filtration disk stack 14 via a filtrate discharge port 22 and into a filtrate plenum 32 for transfer, via a filtrate discharge outlet 28 to process. A fraction of the filtrate passes through orifice sets 18 and 20 and is conveyed, via the sparger support tubes 16, downward, through the activation piston 74 and into the immersion chamber 50 primarily via the open the ends of the sparger support tubes 52 and slightly through the controlled entry pressured gas entrainment orifices 54. Air or gas enclosed within the immersion chamber 50 is released through an air or gas vent port 58 as the immersion chamber 50 eventually fills with filtrate.

The chemistry of the filtrate contained within the immersion chamber 50 may be monitored via the chemical sensor 62 located in sensor port 68. If necessary, chemicals to assist with optimum filter disk cleaning efficiency are injected into the immersion chamber 50 via the chemical inlet port 60. If necessary, the temperature of the filtrate required to achieve the optimum filter disk cleaning efficiency can be controlled within the immersion chamber 50 by means of a thermostatically controlled heating element 66 inserted into the immersion chamber 50 via an insertion port 64.

Figure 3:
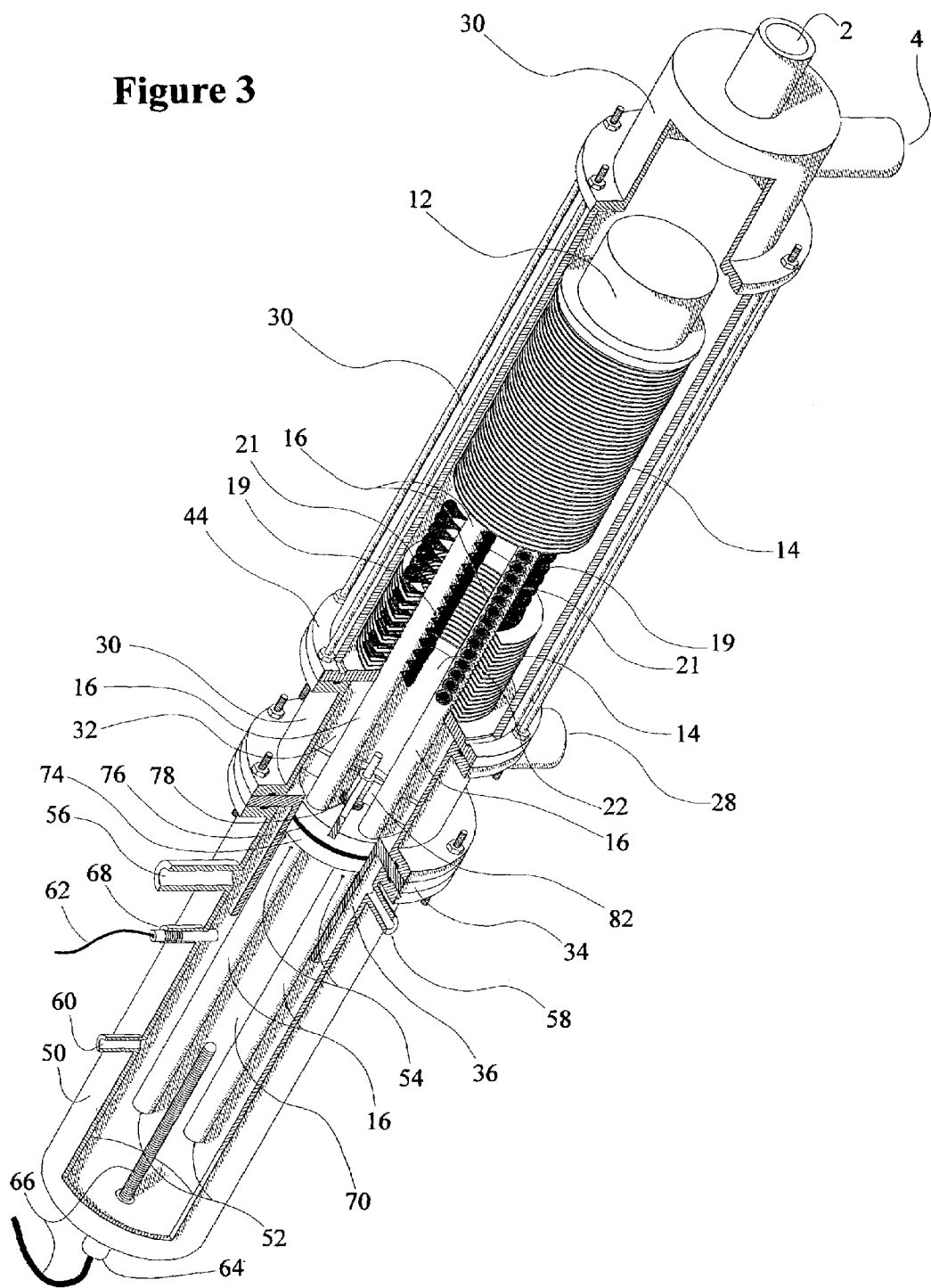
FIG. 3 is a top perspective view of an embodiment of the invention, illustrated as operating in a flushing, cleaning mode.
Figure 4:
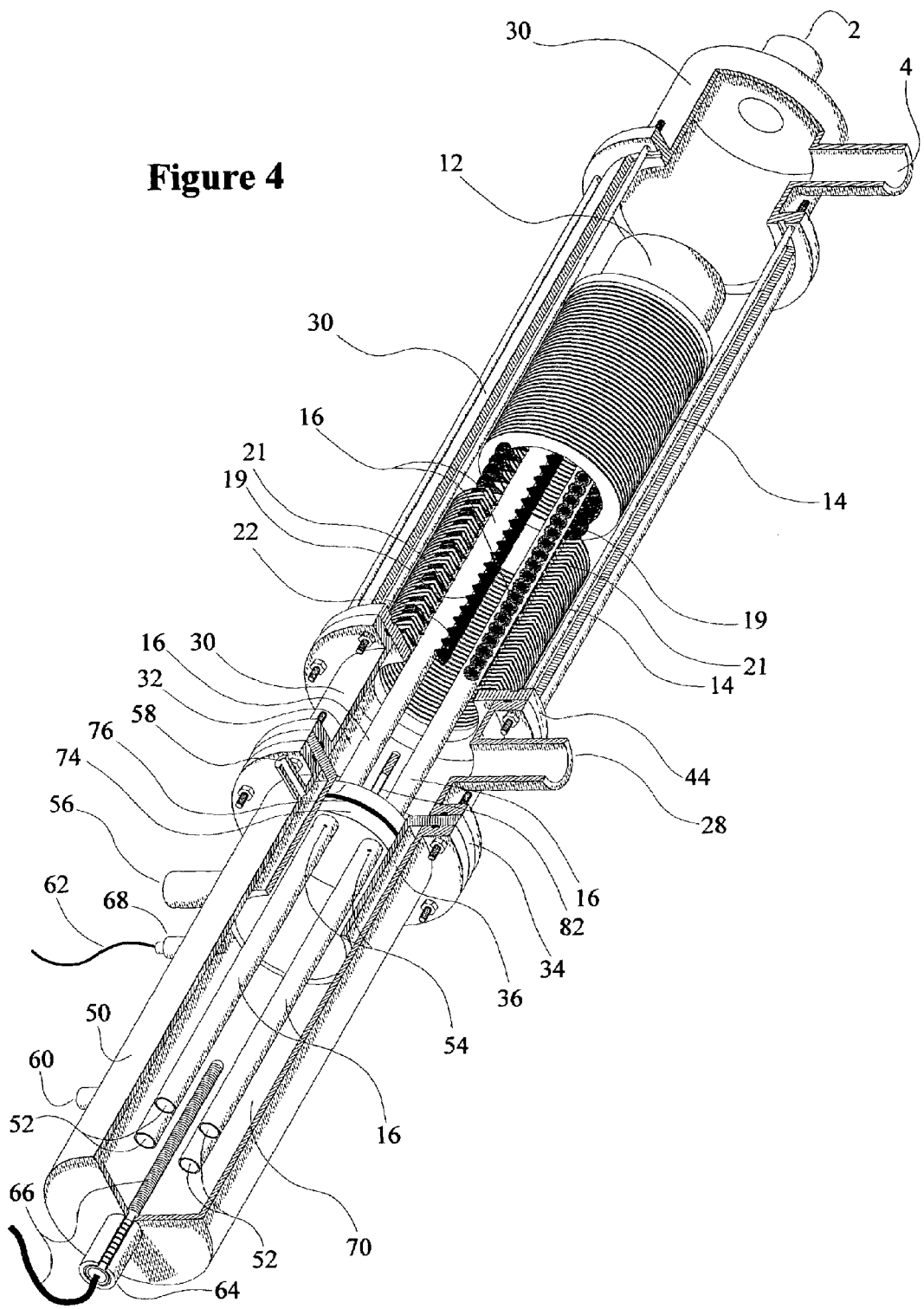
FIG. 4 is a bottom perspective view of an embodiment of the invention, illustrated as operating in a flushing, cleaning mode.

Description—FIGS. 3 and 4

Direct to obtaining the effect of the invention, a simple embodiment of the invention, operating in the flushing, cleaning mode, is illustrated in perspective on FIG. 3 as a prospective to the upstream view and FIG. 4 as a prospective to the downstream view. The invention, as illustrated, is configured for service employing external fluid control valves, which are not shown. The components are delineated and defined as in the previous FIGS. 1 and 2. The following defines operations during the flushing process.

High pressure air or gas is introduced into the immersion chamber 70 via the pressured gas inlet port 56. Fluid within the immersion chamber 50 is pressured, hydraulically forcing the activation piston 74 and activation piston seals 76 upward into the activation cylinder 36 compressing the activation piston spring 78. The sparger support tubes 16 are lifted by the motion of the activation piston 74, thereby lifting the disk compression block 12 away from the disk filtration stack 14, releasing the compression holding the disk filtration stack 14 axially together. Concurrently with this action, fluids within the immersion chamber 50 are pressured and driven into the open lower ends 52 of the sparger support tubes and up the sparger support tubes 16 to the orifices 18 and 20. Pressurized fluid is forced from the orifices 18 and 20 as the sparger support tubes 16 rise upward through the decompressing filtration disk stack 14, facilitating an upward moving impact of vena-contracta of the sprays 19 and 21 upon the internal surfaces of the filter disk stack 14 thereby separating and opening the disks for compressed gas enhanced scouring and cleaning.

During the lifting phase of the activation piston 74 and attached sparger support tubes 16 with the affixed disk compression block 12, high pressure gas is being directed into the immersion chamber 50. The upper placement of the high pressure gas inlet 56 and the extension of the activation cylinder 36 downward into the immersion chamber 50, assures that during the rising phase of the sparger support tubes 16 and the vena-contracta sweeping open of the filtration disks, the controlled entry pressured gas entrainment orifices 54 are not contacted by the high pressure gas. This assures that the vena-contractas associated with the sprays 19 and 21 have no entrained gas and are therefore robust, sharp and piercing as they are driven, in the rising fashion of the sparger support tubes 16, against the internal face of the filtration disk stack 14.

The activation piston 74, the sparger support tubes 16 and the affixed disk compression block 12 rise under pressure from the immersion chamber 50 to a fixed stop point. The fluid level in the immersion chamber 50 drops to a level permitting break over of the high pressure gas into the internal area of the activation cylinder 36. The high pressure gas then enters the controlled entry pressured gas entrainment orifices 54 on the sparger support tubes 16 and injects into the fluid conveyed in the sparger support tubes 16 from the immersion chamber 50 to the orifices 18 and 20. The high pressure gas entrained within sprays 19 and 21 generates an explosive scouring action across the opened filtration disk stack 14, rapidly and efficiently cleaning it. After impacting and cleaning the filter disks, the waste water discharges from the filter via the outlet for flushing and cleaning waste 4.

Upon completion of the cleaning process, the high pressure gas within the immersion chamber 50 is released via gas vent 58. The compressed activation piston spring 78 then drives the activation piston 74, the sparger support tubes 16 and the disk compression block 12 downward, toward the immersion chamber. The disk compression block 12 contacts and recompresses the now clean disk filtration stack 14 and filtration can then again proceed.

Description—FIGS. 5 and 6

Direct to obtaining the effect of the invention, an embodiment of the invention, operating in the filtration mode, is illustrated in perspective on FIG. 5 as a prospective to the upstream view and FIG. 6 as a prospective to the downstream view. This embodiment of the invention, as illustrated, is configured to employ integral valves as defined in a prior patent granted to the inventor of the present art. Reference U.S. Pat. No. 6,752,920 B2.

Mechanically this embodiment consists of two primary component bodies with conveyances for ingress and egress. The two primary component bodies are a filter body 30 and a filtrate immersion body 50. The filter body 30 includes an unfiltered fluid inlet 2, in communication with an internal inlet port 6, an outlet for flushing and leaning waste 4 and a filtrate product outlet 28. The filtrate immersion body 50 includes a flushing fluid inlet 72.

Internally, an upstream end of a filtration disk stack 14 is sealed by a disk compression block 12 in a compressed filtration mode position. This disk compression block also incorporates an inlet port valve seat 8 and a centrifugal inlet impellor 10 on the side opposite the filtration disk stack 14. The disk compression block 12 is rigidly attached to four sparger support tubes 16. The downstream end of the filtration disk stack 14 is sealed by a disk support base 44. The filtration disk stack 14 is laterally supported by the four sparger support tubes 16. The filtration disk stack 14 is held in compression by tension in the sparger support tubes 16 pulling downward upon the attached disk compression block 12. The sparger support tubes 16 pass downward through a filtrate port 11 in the disk support base 44, penetrating through a filtrate valve 42, in a sliding seal fashion, passing downward through a filtrate plenum 32 area, which directs filtrate to the filtrate product discharge port 28, further penetrating downward through, but being rigidly affixed to, an activation piston 74. This piston and associated seal 76 are laterally supported by an activation cylinder 36 which is affixed within the confines of an immersion chamber 70 defined internal to the filtrate immersion body 50. The activation cylinder 36 is supported to the filtrate immersion body 50 via the activation cylinder support 34. The activation piston 74 is held under the force of an activation piston spring 78 in a downward, toward the immersion chamber 70, direction. The activation piston spring 78 is supported in compression mode by a rigidly mounted activation piston spring support 82. The activation piston spring 78 forces tension in the sparger support tubes 16 which pull the disk compression block 12 downward in compressive contact with the filtration disk stack 14. Thereby providing the compressive force required during filtration. The sparger support tubes 16 are attached to, but penetrate through the activation piston 74 extending downward into the immersion chamber 50.

In filtration operation, unfiltered fluid is introduced, under pressure, into a filter body 30 via inlet 2. The unfiltered fluid travels through inlet port 6 and discharges from a valve seat receiver end of the inlet port 6 onto a inlet valve seat area 8 located on top of the disk compression block 12. The unfiltered fluid impacts against the inlet valve seat area 8 and is impelled by the impact radially outward, acquiring a swirl while passing through turning vanes of a centrifugal inlet impeller 10.

The swirling, unfiltered fluid passes through an annular space between an interior surface of filter body 30 and external to the surface of the filtration disk stack 14. The upstream end of the filtration disk stack 14 stack is sealed by the disk compression block 12, being in filtration mode position. The downstream end of the filtration disk stack 14 is sealed by a disk support base 44. The fluid passes through the filtration disk stack 14 and accedes to the internal volume of the filtration disk stack 14 as a filtrate. The majority of the filtrate exits the filtration disk stack 14 via a filtrate discharge port 22 adjacent to a connecting shaft 40, past an open discharge valve 42 and enters a filtrate plenum 38 for transfer, via the filtrate discharge outlet 28, to process. A fraction of the filtrate passes through orifice sets 18 and 20 and is conveyed, via the sparger support tubes 16, through the activation piston 76 and into an immersion chamber 50.

Description—FIGS. 7 and 8

Direct to obtaining the effect of the invention, this embodiment of the invention, operating in the flushing, cleaning mode, is illustrated in perspective on FIG. 7 as a prospective to the upstream view and FIG. 8 as a prospective to the downstream view. This embodiment of the invention, as illustrated, is configured to employ integral valves as defined in a prior patent granted to the inventor of the present art. Reference U.S. Pat. No. 6,752,920 B2. The components are delineated and defined as in the previous FIGS. 5 and 6. The following defines operations during the flushing process.

Flushing fluid is introduced into the immersion chamber 70 via the flushing fluid inlet 72. Fluid within and entering the immersion chamber 50 is pressured, hydraulically forcing the activation piston 74 and activation piston seals 76 upward into the activation cylinder 36 compressing the activation piston spring 78. The sparger support tubes 16 are lifted by the motion of the activation piston 74, thereby lifting the filtrate block valve spring 80 against the filtrate block valve 42 sealing it against the filtrate port 22, the disk compression block valve 12 away from the disk filtration stack 14 and placing the inlet port valve seat 8 in sealing action against the inlet port 6. This action providing the multiple effects of releasing the compression holding the disk filtration stack 14 axially together as well as shutting off the incoming flow and isolating the filtrate plenum 32 from the filtration disk stack 14. Concurrently with this action, fluids within the immersion chamber 50 are pressured and driven into the open lower ends 52 of the sparger support tubes and up the sparger support tubes 16 to the orifices 18 and 20. Pressured fluid is forced from the orifices 18 and 20 as the sparger support tubes 16 rise upward through the decompressing filtration disk stack 14, facilitating an upward moving impact of vena-contracta of the sprays 19 and 21 upon the internal surfaces of the filter disk stack 14 thereby optimally separating the disks for cleaning. After the rising action of the activation piston 74 has reached a stop, pressured flushing fluid continues to enter the immersion chamber 50 via the flushing fluid inlet 72, passing upward through the sparger support tubes 16 and exiting from the orifices 18 and 20 as sprays 19 and 21 with these sprays configured for impact of the vena-contracta upon the internal disk surfaces of the disk filtration stack 14. After impacting and cleaning the filter disks, the waste water discharges from the filter via the outlet for flushing and cleaning waste 4.

Upon completion of the cleaning process entry of the pressured flushing fluid into the immersion chamber 50 via the flushing fluid inlet 72 is stopped. The compressed activation piston spring 78 then drives the activation piston 74, the sparger support tubes 16 and the disk compression block 12 downward, toward the immersion chamber. The disk compression block 12 contacts and recompresses the now clean disk filtration stack 14, the inlet port valve seat 8 is removed from sealing the inlet port 6, the filtrate block valve 42 is moved away from the filtrate port 22 and filtration can then again proceed.

Description—FIGS. 9 and 10

Direct to obtaining the effect of the invention, a preferred embodiment of the invention, operating in the filtration mode, is illustrated in perspective on FIG. 9 as a prospective to the upstream view and FIG. 10 as a prospective to the downstream view. This preferred embodiment of the invention, as illustrated, is configured to employ integral valves as defined in a prior patent granted to the inventor of the present art. Reference U.S. Pat. No. 6,752,920 B2.

Mechanically this embodiment consists of two primary component bodies with conveyances for ingress and egress. The two primary component bodies are a filter body 30 and a filtrate immersion body 50. The filter body 30 includes an unfiltered fluid inlet 2, an outlet for flushing and cleaning waste 4 and a filtrate product outlet 28. The filtrate immersion body 50 includes a pressured gas inlet 56, a gas vent 58, an optional chemical feed port 60, an optional chemical sensor port 68 employing an immersion filtrate chemistry monitoring sensor 62 and an optional heating element port 64 employing an immersion filtrate heating element 66.

Internally, an upstream end of a filtration disk stack 14 is sealed by a disk compression block 12 in a compressed filtration mode position. This disk compression block also incorporates an inlet port valve seat 8 and a centrifugal inlet impellor 10 on the side opposite the filtration disk stack 14. The disk compression block 12 is rigidly attached to four sparger support tubes 16. The downstream end of the filtration disk stack 14 is sealed by a disk support base 44. The filtration disk stack 14 is laterally supported by the four sparger support tubes 16. The filtration disk stack 14 is held in compression by tension in the sparger support tubes 16 pulling downward upon the attached disk compression block 12. The sparger support tubes 16 pass downward through a filtrate port 11 in the disk support base 44, penetrating through a filtrate valve 42, in a sliding seal fashion, passing downward through a filtrate plenum 32 area which directs filtrate to the filtrate product discharge port 28, further penetrating downward through, but being rigidly affixed to, an activation piston 74. This piston and associated seal 76 are laterally supported by an activation cylinder 36 which is affixed within the confines of an immersion chamber 70 defined internal to the filtrate immersion body 50. The activation cylinder 36 is supported to the filtrate immersion body 50 via the activation cylinder support 34. The activation piston 74 is held under the force of an activation piston spring 78 in a downward, toward the immersion chamber 70, direction. The activation piston spring 78 is supported in compression mode by a rigidly mounted activation piston spring support 82. The activation piston spring 78 forces tension in the sparger support tubes 16 which pull the disk compression block 12 downward in compressive contact with the filtration disk stack 14. Thereby providing the compressive force required during filtration.

The sparger support tubes 16 are attached to, but penetrate through the activation piston 74. Controlled entry pressured gas entrainment orifices 54 penetrate the sparger support tubes immediately below the activation piston 74 within the confines of the activation cylinder 36. The sparger support tubes 16 extend, with open ends 52, nearly to the base of the immersion chamber 70.

In filtration operation, unfiltered fluid is introduced, under pressure, into a filter body 30 via inlet 2. The unfiltered fluid travels through inlet port 6 and discharges from a valve seat receiver end of the inlet port 6 onto a inlet valve seat area 8 located on top of the disk compression block 12. The unfiltered fluid impacts against the inlet valve seat area 8 and is impelled by the impact radially outward, acquiring a swirl while passing through turning vanes of a centrifugal inlet impeller 10.

The swirling, unfiltered fluid passes through an annular space between an interior surface of filter body 30 and external to the surface of the filtration disk stack 14. The upstream end of the filtration disk stack 14 stack is sealed by the disk compression block 12, being in filtration mode position. The downstream end of the filtration disk stack 14 is sealed by a disk support base 44. The fluid passes through the filtration disk stack 14 and accedes to the internal volume of the filtration disk stack 14 as a filtrate. The majority of the filtrate exits the filtration disk stack 14 via a filtrate discharge port 22 adjacent to a connecting shaft 40, past an open discharge valve 42 and enters a filtrate plenum 38 for transfer, via the filtrate discharge outlet 28, to process. A fraction of the filtrate passes through orifice sets 18 and 20 and is conveyed, via the sparger support tubes 16, through the activation piston 76 filling the immersion chamber 50.

Description—FIGS. 11 and 12

Direct to obtaining the effect of the invention, this preferred embodiment of the invention, operating in the flushing, cleaning mode, is illustrated in perspective on FIG. 11 as a prospective to the upstream view and FIG. 12 as a prospective to the downstream view. This preferred embodiment, as illustrated, is configured to employ integral valves as defined in a prior patent granted to the inventor of the present art. Reference U.S. Pat. No. 6,752,920 B2. The components are delineated and defined as in the previous FIGS. 9 and 10. The following defines operations during the flushing process.

High pressure air or gas is introduced into the immersion chamber 70 via the pressured gas inlet port 56. Fluid within the immersion chamber 50 is pressured, hydraulically forcing the activation piston 74 and activation piston seals 76 upward into the activation cylinder 36 compressing the activation piston spring 78. The sparger support tubes 16 are lifted by the motion of the activation piston 74, thereby lifting the filtrate block valve spring 80 against the filtrate block valve 42 sealing it against the filtrate port 22, the disk compression block valve 12 away from the disk filtration stack 14 and placing the inlet port valve seat 8 in sealing action against the inlet port 6. This action providing the multiple effects of releasing the compression holding the disk filtration stack 14 axially together as well as shutting off the incoming flow and isolating the filtrate plenum 32 from the filtration disk stack 14. Concurrently with this action, fluids within the immersion chamber 50 are pressured and driven into the open lower ends 52 of the sparger support tubes and up the sparger support tubes 16 to the orifices 18 and 20. Pressured fluid is forced from the orifices 18 and 20 as the sparger support tubes 16 rise upward through the decompressing filtration disk stack 14, facilitating an upward moving impact of vena-contracta of the sprays 19 and 21 upon the internal surfaces of the filter disk stack 14 thereby separating and opening the disks for compressed gas enhanced scouring and cleaning.

During the lifting phase of the activation piston 74 and attached sparger support tubes 16 and associated mechanisms, high pressure gas is being directed into the immersion chamber 50. The upper placement of the high pressure gas inlet 56 and the extension of the activation cylinder 36 downward into the immersion chamber 50, assures that during the rising phase of the sparger support tubes 16 and the vena-contracta sweeping open of the filtration disks, the controlled entry pressured gas entrainment orifices 54 are not contacted by the high pressure gas. This assures that the vena-contractas associated with the sprays 19 and 21 have no entrained gas and are therefore robust, sharp and piercing as they are driven, in the rising fashion of the sparger support tubes 16, against the internal face of the filtration disk stack 14.

The activation piston 74, the sparger support tubes 16, the filtrate block valve spring 80, the filtrate block valve 42, the affixed disk compression block 12 and associated inlet port valve seat 8 all rise under pressure from the immersion chamber 50 to a fixed stop point where the filtrate block valve 42 seals the filtrate port 22, the disk compression block 12 has released compression on the filtration disk stacks 14 and the inlet port valve seat 8 has sealed the inlet valve port 6. The fluid level in the immersion chamber 50 drops to a level permitting break over of the high pressure gas into the internal area of the activation cylinder 36. The high pressure gas then enters the controlled entry pressured gas entrainment orifices 54 on the sparger support tubes 16 and injects into the fluid conveyed in the sparger support tubes 16 from the immersion chamber 50 to the orifices 18 and 20. The high pressure gas entrained within sprays 19 and 21 generates an explosive scouring action across the opened filtration disk stack 14, rapidly and efficiently cleaning it. After impacting and cleaning the filter disks, the waste water discharges from the filter via the outlet for flushing and cleaning waste 4.

Upon completion of the cleaning process, the high pressure gas within the immersion chamber 50 is released via gas vent 58. The compressed activation piston spring 78 then drives the activation piston 74 and the attached sparger support tubes 16 downward toward the immersion chamber. This downward motion of the sparger support tubes moves the filtrate block valve 42 from the filtrate port, the inlet port valve seat 8 out of sealing relationship to the inlet valve port 6 and places the disk compression block in compressive contact with the now clean filtration disk stack 14 and filtration can then again proceed.

Description—FIG. 13

Direct to obtaining the effect of the invention there are extentions of the foregoing defined embodiments where multiples of such embodiments are purveyed in single bodies FIG. 13 is provided as a representative sample of such a practice.

CONCLUSION, RAMIFICATIONS, AND SCOPE

The knowledgeable reader will certainly appreciate the advantages of the invention in providing a means for substantially improving the disk filter cleaning efficiency and therefore enhancing the industrial performance of disk filtration devices. In contrast to the prior art, the reader will note that the invention provides dramatically improved performance service for a wide range of filtration applications in an efficient, simple, reliable, geometrically compact and cost effective manner.

In further contrast to the prior art, the reader will note that, through the employ of pressured gas charges, the invention provides the means for efficient filtration performance without the need for the troublesome and costly high volume flushing valves required in embodiments of the prior art. Elimination of these valves reduces the capital and operating costs previously exacted by the prior art. Additionally, elimination of these valves provides a substantial advantage over the prior art in empowering the employment of aggressive chemicals for cleaning enhancement. Often the chemicals required for efficient filtration element cleaning are aggressive to such an extent that they will damage or destroy the flush valves necessary in the prior art. Inasmuch as the invention eliminates these valves, those applications not serviceable by the prior art, because of the requirement for chemical cleaning, can now be readily addressed by means of the invention. Similarly, those applications not practical, within the constraints of the prior art, due to the presence in the feedwater or filtrate of valve endangering aggressive chemicals, can now be readily serviced by the invention.

The invention further provides a means of establishing and maintaining a very high flush cleaning energy for maximum scouring and cleaning action of the filtration disks. As a consequence of the entrainment of compressed gas into the flushing fluid, high pressure is generated and maintained during the flushing process. Industrial applications serviced by the invention thereby maintain superior disk cleanliness and high performance. Accordingly, the frequency and duration of the cleaning cycle is minimized. Downtime, wear and tear on equipment and maintenance expenses are all substantially reduced while reliability is dramatically increased. The reduced flushing frequency further affords the reduction waste water volume, thereby reducing waste treatment or disposal costs. The waste water volume reduction affords the potential for water pollution discharge abatement and indeed provides significant potential for the amelioration of environmental damage resulting from the excessive discharge volumes consistent with the prior art.

As a consequence of the proficiency of the invention to readily providing flushing fluid at an elevated temperature, the cleaning efficiency can be substantially improved. Accordingly, the frequency and duration of the cleaning cycles is minimized. Downtime, wear and tear on equipment and maintenance expenses are all substantially reduced while reliability is dramatically increased. This benefit further affords the reduction of waste water volume, thereby reducing waste treatment or disposal costs. Waste water volume reduction affords the potential for water pollution discharge abatement and indeed provides significant potential for the amelioration of environmental damage resulting from excessive discharge.

Further, there are many industrial applications wherein the separated solids are viscous or sticky at room temperature conditions and, as a consequence, staunchly adhere to filtration disks. In many such applications these otherwise immovable solids can be readily purged with an elevated temperature flush. This advantage further opens the industrial market to successful disk filtration applications. As an additional consideration, high temperatures are often employed for biological sterilization purposes. Those applications in which filtration difficulties occur due to biofouling can be readily resolved through the exploitation of the sterilization attributes of elevated temperature flushing.

As a consequence of the proficiency of the invention to provide chemical cleaning assistance to the flushing fluid, the cleaning efficiency of the filtration disks can be substantially improved. Accordingly, the frequency and duration of the cleaning cycle of the invention is minimized. Downtime, wear and tear on equipment and maintenance expenses are all substantially reduced while reliability is dramatically increased. This benefit further affords the reduction of waste water volume, thereby reducing waste treatment or disposal costs. Waste water volume reduction affords the potential for water pollution discharge abatement and indeed provides significant potential for the amelioration of environmental damage resulting from excessive discharge.

There are many applications in the industrial market in which disk filtration processes are difficult as a result of the tenacity to which certain solids can adhere to disk filtration surfaces. Often chemical treatment at elevated temperatures is required to dispel these solids from the disk surfaces. As a consequence of the of the ability of the invention to provide both elevated temperatures and chemicals to the flush fluid, the removal of such solids from the filtration elements can be assured, thereby providing a means to facilitate efficient filtration processes to such applications.

There are many applications wherein the mechanical seals of the prior art were notoriously short lived because of abrasive particles in the feed water. The invention completely resolves these difficulties by placing all sliding seals within dean filtrate environments at all times. The saving in labor, parts and process downtime is dramatic and profit assertive.

The invention further provides a means of establishing and maintaining a very high flush cleaning energy for maximum scouring and cleaning action of the filtration disks through a combination both of axially moving and stationary vena-contracta focused flushing and high energy scouring of the filtration disks with high pressure gas entrained fluids. Industrial applications serviced by the invention thereby maintain superior disk cleanliness and high performance. Accordingly, the frequency and duration of the cleaning cycle is minimized. Downtime, wear and tear on equipment and maintenance expenses are all substantially reduced while reliability is dramatically increased. The reduced flushing frequency further affords a reduction of waste water thereby reducing waste treatment or disposal costs. The waste water volume reduction affords the potential for water pollution discharge abatement and indeed provides significant potential for the amelioration of environmental damage resulting from the excessive discharge volumes consistent with the prior art.

The advantages over the prior art are substantial. Expensive, troublesome and inefficient filtration applications can be dramatically successful through employment of the invention. Further, new and novel processes, products or businesses, not previously feasible because of the performance limitations of the prior art, are made possible. The reader will also see that other advantages are inherent to the design and performance characteristics of the invention. Some of these additional advantages are:

- The invention provides resolution of fundamental deficiencies of flush cleaning effectiveness inherent in the filtration performance and expense of the prior art. Such deficiency resolutions being of particular importance to industrial applications of disk filtration processes.
- In addition to providing superior performance for industrial applications, the invention can also provide enhanced performance for agricultural applications.
- The invention affords a means to eliminate the fabrication expense, mechanical complexity and operational liabilities associated with the critical flush valve components of the prior art.
- The invention eliminates the pressure drop and/or associated flow impediment accompanying the flush valves of the prior art. Consequently the capital and operating costs, as well as the pumping energy requirements associated with filtration operation, are substantially reduced over that of the prior art.
- The invention provides the means to efficiently flush clean disk filtration systems in those applications wherein either a sufficiently high filtrate pressure or a sufficiently high external source hydraulic pressure is not available.
- The invention eliminates the failures and associated downtime, labor and maintenance expense resulting from plugging and fouling of the filtration surfaces with debris which require a chemically and/or thermally enhanced flush medium for efficient cleansing.
- The invention readily permits the use of disk filtration processes in which chemical or thermal bio sterilization properties are required of the flush medium.
- In contrast to the relatively low energy hydraulic jet flushing action of the prior art, the invention exploits entrainment of dispersed compressed gas into the flush fluid so as to dramatically energize the flush medium impact energy upon the filtration surfaces. This pneumatically enhanced, high energy jetting action purveys a much more efficient cleaning activity upon the filtration surfaces than the prior art. The enhanced cleaning activity thereby provides the opportunity to readily exploit disk filtration services in applications hitherto difficult or not possible with the prior art.

Although the foregoing description contains many examples and considerations, these should not be construed as limiting the scope of the invention but instead as affording examples and illustrations of some of the preferred embodiments of this invention. For example, there are many different configurations and orientations for placement of the inlets, outlets and assorted ports relating to the filter bodies and to the filtrate immersion bodies as well as many other internal and external porting, sealing spring tensioning configurations and orientations.

Further, there are many possible configurations wherein the immersion chambers, activation cylinders and activation pistons and driving apparatuses are integrated into many configurations within and without the confines of the filtration bodies.

Other obvious and meritable possibilities are those configurations wherein multiple chemicals react within the immersion chamber prior to or during the flushing operation so as to generate a product which further enhances disk cleaning efficiency. An example of such a situation would be in which chemicals reacting within the immersion chamber generate a high pressure gas for driving or enhancing the disk cleaning process. Indeed, such generated gas could supplement or replace the air or gas employed to pressurize and impel the flushing operation.

It also is conceivable that filtrate from the outlet port could, if provided enough pressure, be routed for use to pressurize and drive treated fluid from the immersion chamber through the cleaning process. Further, it should be obvious to those familiar with the art, that porting into the immersion chamber could be employed to introduce filtrate or other cleansing or neutralizing media into the reaction chamber so as to provide a final flushing and purging action upon the filtration surfaces and associated confines. Whereby, such flushing and purging provides for eradication of residual flush medium prior to continuation of the filtration process.

The reader familiar with the art should also deem it obvious that porting could also be so devised so as to permit direct communication into the hollow sparger support tubes which convey the flush fluid from the immersion chamber to filter. Such direct communication would provide the means to introduce flushing gas or air or additional chemicals into the cleaning media during the actual flushing process.

Clearly, the scope, ramifications and potential of the invention are well beyond the discussions of this document and therefore the true scope and delineation of the invention must be determined by the appended claims and their legal equivalents, rather than the examples provided herein.

I claim the following:

1. A self cleaning filtration device comprising:
   a) a cleanable filtration assemblage comprised of multiple cleanable elements;
   b) an inlet port for fluid ingress;
   c) an outlet port for filtrate egress;
   d) an inlet port for pressure ingress;
   e) a filtrate immersion chamber for fluid storage;
   f) an activation cylinder assembly that extends into said filtrate immersion chamber;
   g) an activation piston assembly that is laterally constrained within said activation cylinder assembly;
   h) a hollow sparger support assembly that is attached to said activation piston assembly;
   i) a block unit that is attachable to the end of said hollow sparger support assembly;
   j) and a ported, structural support assembly for said cleanable filtration assemblage.

2. The self cleaning filtration device of claim 1 wherein said multiple cleanable elements are disk filters.

3. The self cleaning filtration device of claim 1 wherein pressured liquid is supplied to said inlet port for pressure ingress.

4. The self cleaning filtration device of claim 1 wherein pressured gas is supplied to said inlet port for pressure ingress.

5. The self cleaning filtration device of claim 1 wherein said hollow sparger support assembly contains hollow conduits to facilitate hydraulic communication between said cleanable filtration assemblage and said filtrate immersion chamber.

6. The self cleaning filtration device of claim 1 wherein said activation piston assembly contains hollow conduits to facilitate hydraulic communication between said filtrate immersion chamber and said activation piston assembly.

7. The self cleaning filtration device of claim 1 wherein a spring assembly assists the assembled motion of said activation piston assembly, said hollow sparger support assembly and said block unit.

8. A self cleaning filtration device comprising:
   a) a cleanable filtration assemblage comprised of multiple cleanable elements;
   b) an inlet port for fluid ingress;
   c) an outlet port for filtrate egress;
   d) an outlet port for waste product egress;
   e) an inlet port for pressure ingress;
   f) a filtrate immersion chamber for fluid storage;
   g) an activation cylinder assembly that extends into said filtrate immersion chamber;
   h) an activation piston assembly that is laterally constrained within said activation cylinder assembly;
   i) a hollow sparger support assembly that contains a plurality of orifices and is attached to, and penetrates through, said activation piston assembly;
   j) a block unit that is attachable to the end of said hollow sparger support assembly; and
   k) a ported, structural support assembly for said cleanable filtration assemblage.

9. The self cleaning filtration device of claim 8 wherein said multiple cleanable elements are disk filters.

10. The self cleaning filtration device of claim 8 wherein pressured liquid is supplied to said inlet port for pressure ingress.

11. The self cleaning filtration device of claim 8 wherein pressured gas is supplied to said inlet port for pressure ingress.

12. The self cleaning filtration device of claim 8 wherein seals are provided between said activation piston assembly and said activation cylinder assembly.

13. The self cleaning filtration device of claim 8 so configured that said plurality of orifices generate a vena-contracta of sprays that contact the surfaces of said cleanable filtration assemblage.

14. The self cleaning filtration device of claim 8 wherein said filtrate immersion chamber contains chemical feed ports to enhance cleaning performance.

15. The self cleaning filtration device of claim 8 wherein said filtrate immersion chamber contains a thermal heating element for heating filtrate.

16. A method for filtering fluids using a self cleaning filtration device comprising:
   placing one end of a filtration assemblage upon a ported structural support assembly so that the filtrate side of said filtration assemblage circumscribes said ported structural support assembly;
   b) placing a block unit upon the non-filtrate side of said filtration assemblage such that said block unit supports said filtration assemblage in a position which circumscribes said ported structural support assembly;
   c) attaching said block unit to a hollow sparger support assembly that contains a plurality of orifices;
   d) attaching said hollow sparger support assembly to an activation piston assembly so that at least one orifice of said hollow sparger support assembly extends below said activation piston assembly;
   e) supporting said activation piston assembly laterally within the confines of an activation cylinder assembly wherein said activation cylinder assembly extends into an immersion chamber and said immersion chamber is in hydraulic communication with said filtrate side of said filtration assemblage by means of said hollow sparger support assembly;
   f) porting ingress fluid to the non-filtrate side of said filtration assemblage, wherein said ingress fluid passes through said filtration assemblage, said orifices of said hollow sparger support assembly, said ported structural support assembly, an outlet port for egress of said ingress fluid, said hollow sparger support assembly, and into said immersion chamber;
   g) supplying pressured medium by means of an inlet port for pressure ingress into said immersion chamber
   h) hydraulically forcing said activation piston assembly axially away from said immersion chamber, whereby (i) said block unit is moved away from said filtration assemblage in order to expose elements of said filtration assemblage for cleaning and (ii) said ingress fluid from within said immersion chamber are forced through said hollow sparger support assembly to spray clean said elements of said filtration assemblage; and
   i) eliminating said pressured medium to facilitate the combined motion of said activation piston, said hollow sparger support assembly and said unit block in the direction of said immersion chamber.

17. A filtering method according to claim 16, wherein said elements of said filtration assemblage are disk filters.

18. A filtering method according to claim 16, wherein said pressured medium is pressured filtrate.

19. A filtering method according to claim 16, wherein said pressured medium is pressured gas.

20. A filtering method according to claim 16, wherein seals are provided between said activation piston assembly and said activation cylinder assembly.

21. A filtering method according to claim 16, wherein said orifices of said hollow sparger support assembly generate a vena-contracta of sprays that contact the surfaces of said filtration assemblage.

22. A filtering method according to claim 16, wherein said immersion chamber contains one or more chemical injection ports to facilitate cleaning performance.

23. A filtering method according to claim 16, wherein said immersion chamber contains a thermal heating element for heating filtrate.

24. A filtering method according to claim 16 wherein a spring assembly assists the assembled motion of said activation piston assembly, said hollow sparger support assembly and said block unit.

* * * * *